United States Patent
Rohs et al.

(10) Patent No.: US 7,553,254 B2
(45) Date of Patent: Jun. 30, 2009

(54) PRESSING DEVICE FOR TENSIONING TWO GEARING ELEMENTS, GEARING PROVIDED WITH A PRESSING DEVICE OF THIS TYPE, AND METHOD FOR OPERATING SUCH A FRICTION GEARING

(75) Inventors: Ulrich Rohs, Roonstrasse 11, 52351 Düren (DE); Christoph Dräger, Inden (DE); Werner Brandwitte, Langerwehe (DE)

(73) Assignee: Ulrich Rohs, Düren (DE)

( * ) Notice: Subject to any disclaimer, the term of this patent is extended or adjusted under 35 U.S.C. 154(b) by 543 days.

(21) Appl. No.: 10/541,558

(22) PCT Filed: Dec. 23, 2003

(86) PCT No.: PCT/DE03/04255

§ 371 (c)(1), (2), (4) Date: Mar. 14, 2006

(87) PCT Pub. No.: WO2004/061336

PCT Pub. Date: Jul. 22, 2004

(65) Prior Publication Data

US 2006/0194667 A1  Aug. 31, 2006

(30) Foreign Application Priority Data

Jan. 6, 2003 (DE) .................. 103 00 373
Jun. 17, 2003 (DE) .................. 103 27 516
Oct. 16, 2003 (DE) .................. 103 48 718

(51) Int. Cl.
*F16H 15/16* (2006.01)
(52) U.S. Cl. .................. 476/52; 476/9; 476/2; 476/11
(58) Field of Classification Search .................. 476/9, 476/1, 2, 11, 50, 51, 52, 53, 65
See application file for complete search history.

(56) References Cited

U.S. PATENT DOCUMENTS

| 3,087,348 | A | | 4/1963 | Kraus |
| 4,183,253 | A | * | 1/1980 | Borello .................. 476/16 |
| 4,448,087 | A | * | 5/1984 | Barzel .................. 476/51 |
| 5,094,652 | A | | 3/1992 | Hasebe et al. |
| 5,184,981 | A | | 2/1993 | Wittke |
| 5,961,417 | A | | 10/1999 | Schneider et al. |
| 6,030,310 | A | | 2/2000 | Greenwood et al. |
| 6,093,131 | A | * | 7/2000 | Rohs .................. 476/53 |
| 6,277,048 | B1 | | 8/2001 | Rohs |
| 6,824,496 | B2 | * | 11/2004 | Mason et al. .................. 476/51 |

FOREIGN PATENT DOCUMENTS

| DE | 196 43 437 | 4/1998 |
| DE | 198 37 368 | 2/2000 |

(Continued)

OTHER PUBLICATIONS

International Search Report

*Primary Examiner*—David M Fenstermacher
(74) *Attorney, Agent, or Firm*—Collard & Roe, P.C.

(57) ABSTRACT

A pressing apparatus including two pressing apparatus parts for two gear members running together is proposed, with the second pressing apparatus part partially accommodating the force applied by the first pressing apparatus part.

32 Claims, 20 Drawing Sheets

FOREIGN PATENT DOCUMENTS

| | | |
|---|---|---|
| EP | 0466113 | 1/1992 |
| EP | 0878641 | 11/1998 |
| EP | 0980993 | 2/2000 |
| GB | 1600974 | 10/1981 |
| JP | 62258254 | 11/1987 |
| JP | 6174028 | 6/1994 |
| JP | 6174030 | 6/1994 |
| JP | 10169738 | 6/1998 |
| JP | 2001124163 | 5/2001 |
| JP | 2003-28257 | 1/2003 |

* cited by examiner

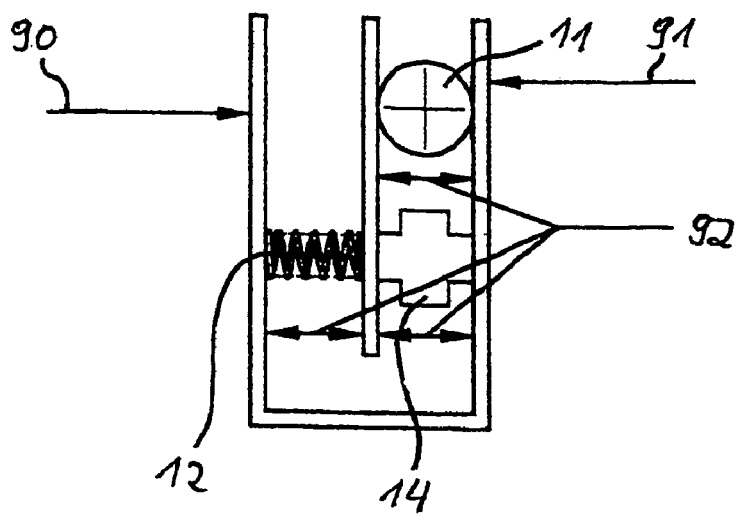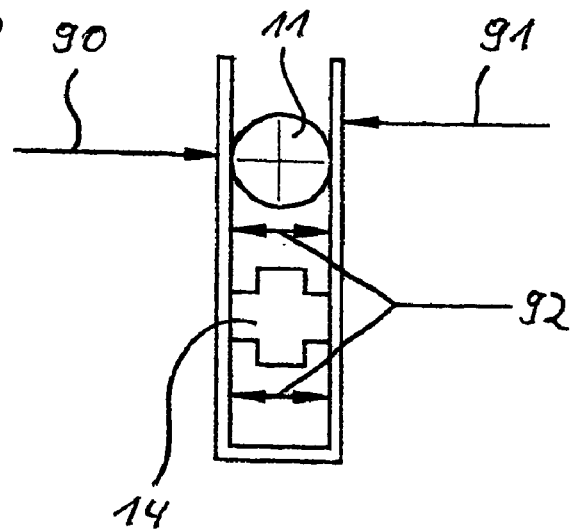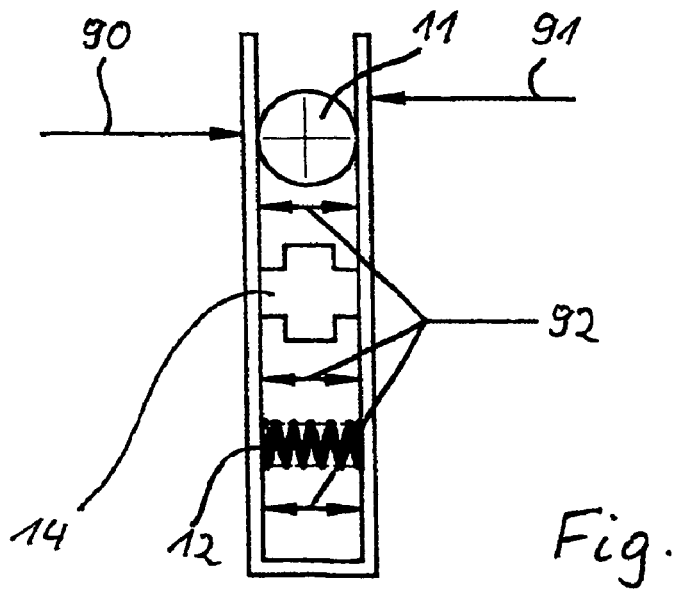

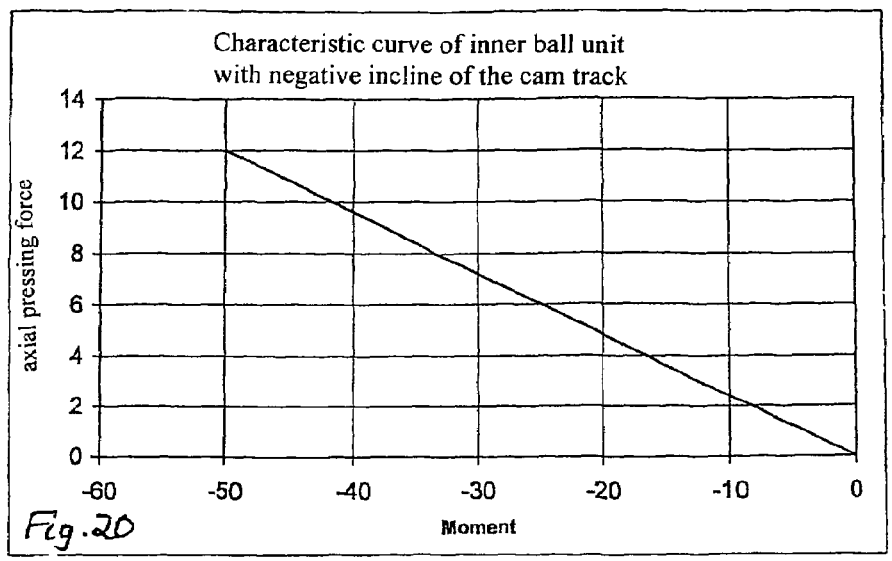
Fig. 20
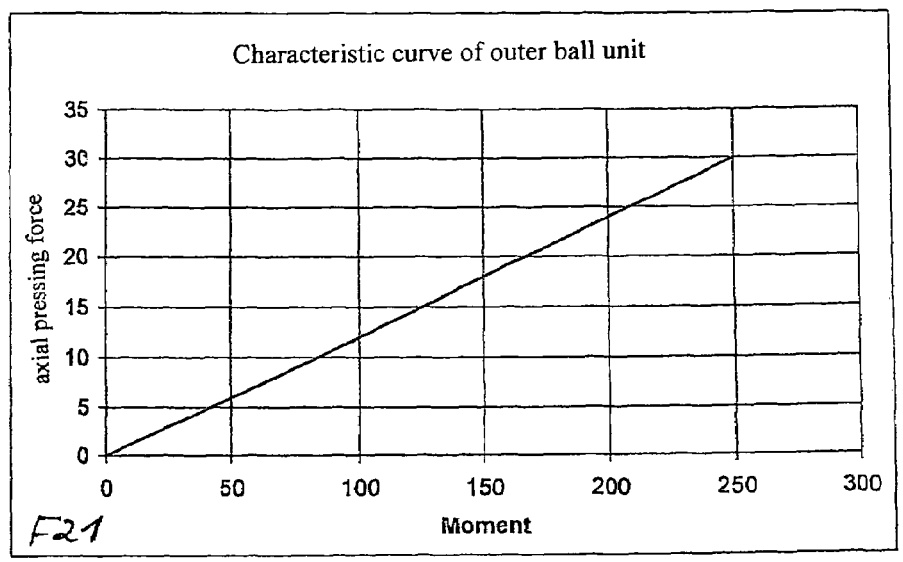
F21
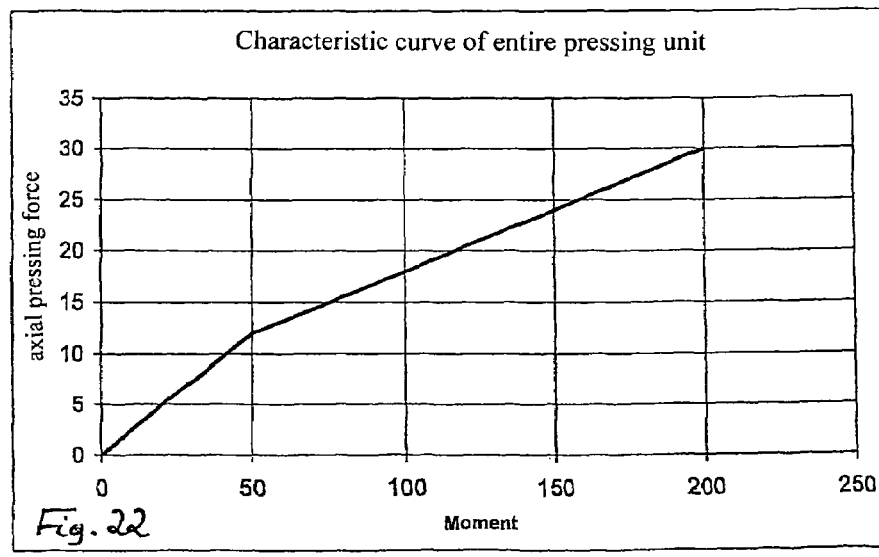
Fig. 22

PRESSING DEVICE FOR TENSIONING TWO GEARING ELEMENTS, GEARING PROVIDED WITH A PRESSING DEVICE OF THIS TYPE, AND METHOD FOR OPERATING SUCH A FRICTION GEARING

CROSS REFERENCE TO RELATED APPLICATIONS

Applicants claim priority under 35 U.S.C. §119 of German Application Nos. 103 00373.8 filed Jan. 6, 2003, 103 27 516.9 filed Jun. 17, 2003 and 103 48 718.2 filed Oct. 16, 2003. Applicants also claim priority under 35 U.S.C. §365 of PCT/DE2003/004255 filed Dec. 23, 2003. The international application under PCT article 21(2) was not published in English.

The invention relates to a pressing apparatus for locking together two gear members running together, to gear members transmitting a torque and to a corresponding gear including such a pressing apparatus.

Such type pressing apparatus, respectively gears, are known from EP 0 878 641 A1 and from EP 0 980 993 A2 respectively. In their second exemplary embodiment, these two printed documents disclose a pressing apparatus which, depending on the torque transmitted by a driven bevel gear of the bevel friction ring gear disclosed therein, applies pressing force to lock the two bevel gears and the friction ring engaging through the two bevel gears and forming a grip around the driving bevel gear. In this manner it is made certain that, at high torques at which otherwise there is a risk of slippage, the pressing force is sufficiently high. Furthermore, in its first exemplary embodiment, the document EP 0 980 993 A2 discloses a pressing apparatus the pressing force of which may be regulated or adjusted from the outside by a hydraulic cylinder.

These arrangements however suffer from the disadvantage that a quite great amount of force reserve must be provided because purely mechanical pressing apparatus find it difficult to adapt to modified overall operation parameters or because pressing apparatus regulated from the outside require quite long reaction times. Accordingly, mechanical pressing apparatus, which moreover can be adjusted to a desired characteristic curve to a very restricted extent only, must be provided with a reserve that takes into account the modified exterior parameters that cannot directly be registered by the mechanics, whereas pressing apparatus regulated from the outside require a reserve to be capable of meeting torque peaks because of the quite long regulation times.

It is the object of the present invention to provide a pressing apparatus, respectively a gear, that offers advantages in this respect.

The solution proposed by the invention is a pressing apparatus for locking together two gear members running together and transmitting a torque with means for registering a relevant parameter, more specifically the torque transmitted and with means for applying a pressing force corresponding to the registered parameter, said pressing apparatus being characterized in that it includes at least two pressing apparatus parts, the first one of the two pressing apparatus parts requiring a shorter reaction time than the second one of the two pressing apparatus parts. Another solution proposed is a gear having two gear members for transmitting torque that are locked together by a corresponding pressing apparatus.

It is understood that such a pressing apparatus including two pressing apparatus parts may advantageously find application in a great variety of gears in which gear members are to be pressed against each other depending on certain parameters. These include more specifically any kind of revolving gears the gear members of which frictionally interact.

The reaction time of the first pressing apparatus part is preferably chosen to be short enough to allow fast reaction to impacts or the like. It is preferred to choose an arrangement that is configured to be purely mechanical so that it hardly requires any reaction time. In this manner, the pressing apparatus is capable of quickly adapting to temporary variations permitting thus to prevent slippage between the gear members running together.

This more specifically can suffice to directly actuate the first pressing apparatus part without regulation, only as a function of the critical parameters. The first pressing arrangement apparatus part (and as a result thereof, the entire pressing apparatus) is thus allowed to adapt very quickly and reliably to impacts or to almost unsteady or unsteady variations of the critical parameter. For this purpose, the first pressing apparatus part in particular needs not be optimised with regard to its characteristic curve depending on the parameter. What is important instead is that the first pressing apparatus part be capable of appropriately reacting to impacts or unsteadyness-more specifically with sufficiently short a reaction time.

An optimal characteristic curve of the entire pressing apparatus is preferably realized by the second pressing apparatus part which accordingly may be optimized preferably with regard to its characteristic curve or with regard to the characteristic curve of the entire pressing apparatus without being capable, or having to, quickly react to impacts or sudden unsteadyness. A particular effect of benefit is achieved if the second pressing apparatus part is regulated so that the characteristic curve may be chosen in the best possible way. The second pressing apparatus part may more specifically be actuated by different, or by a great variety of, parameters so that it is capable of reacting in detail to the respective requirements. Moreover, the pressing apparatus part may be optimized in particular in its control loop with regard to the dampening of oscillations, which as a rule also results in reduced reaction times. As already explained herein above, this latter point however is not so critical since the first pressing apparatus part is capable of reacting within accordingly shorter reaction times.

If configured appropriately, an arrangement of the invention may more specifically permit to minimize the losses in a corresponding gear. It is more specifically possible to design the first pressing apparatus part so that it is optimized in terms of safety or of operational safety whilst the second pressing apparatus part is chosen to have a characteristic curve such that a shift in the characteristic curve due to safety and originating from the first pressing apparatus part is suitably compensated for.

Accordingly, and irrespective of the other features of the present invention, a pressing apparatus for locking together two gear members running together and transmitting a torque having means for registering a relevant parameter, more specifically for registering the torque to be transmitted, and having means for applying a pressing force corresponding to the registered parameter provides the solution to the object mentioned herein above by which the pressing apparatus includes at least two pressing apparatus parts and by which the first pressing apparatus part provides a pressing force that is greater than or equal to the pressing force to be provided by the entire pressing apparatus and the second pressing apparatus part reduces the pressing force provided by the pressing apparatus. Accordingly, a gear having two torque transmitting gear members locked together by means of such a pressing apparatus is advantageous.

With such a design, the first pressing apparatus part is capable of providing the necessary pressing force in excess so that temporary variations in particular can be accommodated while maintaining operational safety. The second pressing apparatus part may in turn reduce the excess pressing force, which permits to minimize losses while avoiding the risk of insufficient pressing force being provided in response of temporary impacts and the like.

Accordingly, it is advantageous if, in addition or as an alternative thereto, the second pressing apparatus part applies a force opposed to the force applied by the first pressing apparatus part. The force may thus be in particular reduced while maintaining operational safety. Furthermore, with such an arrangement, the first pressing apparatus part may immediately and directly make use of its characteristic curve and, if the need arises, counteract the force reduction due to the second pressing apparatus part.

Preferably, the second pressing apparatus part accordingly partially accommodates the force applied by the first pressing apparatus part, this resulting, with an appropriate design, in the advantages described herein above being achieved irrespective of the above mentioned features.

Even if the above mentioned features are utilized individually in a pressing apparatus or a corresponding gear, they may result in considerable loss reduction if the pressing apparatus is suitably optimized. More specifically, it is possible to minimize the bearing forces resulting from the pressing forces by which a respective one of the gear members is carried on a frame or on a casing, this permitting to avoid losses to a considerable extent. With the arrangements described herein above, the safety margins in particular, which are necessarily to be provided for securing them against unpredictable or quick changes in the operational parameters, may be minimized since the first pressing apparatus part is capable of reacting quickly and with sufficient force reserve. Under normal operating conditions, by contrast, the second pressing apparatus part preferably reduces the pressing force or the resulting force for locking to the frame or the casing. The total loss is thereby reduced since impacts or quick changes only occur for a short period of time and accordingly play but a subordinate part over the total operation time.

It is understood that a pressing apparatus can find application in a great variety of gears having gear members running together. It is more specifically suited for arrangements in which the respective gear members either are interacting by being frictionally interlocked or are frictionally interacting or are interacting at the risk of slippage when the pressing force is insufficient. More specifically, in such arrangements, such a pressing apparatus permits to minimize a loss.

With a hydraulic system, a corresponding pressing pressure may for example be applied by an electromagnetically actuated piston. Such an arrangement is of a small and compact construction and comprises a mechanically simple structure.

During its stroke path, the piston may at first close an overflow/refill port. By such an arrangement and by conducting such a method, sufficient amount of hydraulic liquid between the piston and the pressing apparatus is always ensured. If a force is applied to the piston, it causes the fluid to be compressed in the direction of the pressing apparatus until the latter generates sufficient counter pressure. If no force is applied to the piston, excess fluid is allowed to escape through the port whereas on the other side fluid may be supplied from a reservoir through this port if there is not enough fluid.

Alternatively, a gear pump may be provided for hydraulic actuation. Such a gear pump is quite cheap and offers furthermore the advantage that it is capable of applying variable pressing pressures, for example through variable rotational speed or variable torque while requiring hardly any maintenance and maintaining operational safety. The gear pump may in particular be driven by an electric motor with a current dependent torque being preferably provided. This may be achieved in particular by limiting or regulating the current, which as a rule is easier to realize than to regulate the voltage. On the other side, it may be advantageous to regulate the voltage, more specifically if the actuation is digital, because it is easier to implement. A variable pressing force may thus be readily and reliably provided; intentionally, the gear pump not even needs to be completely sealed with regard to its wings and may well comprise slippage. More specifically if the actuation is to regulate torque, the required pressing force may for example be ensured by an increased rpm.

Another pump rather than a gear pump, more specifically another pump that merely provides, like a gear pump, a pressure gradient or that comprises an internal leakage, could also find application.

It is understood that these apparatus for generating a variable pressing force are also advantageous irrespective of the other features of the pressing apparatus or gears for continuously adjustable gears, such as for bevel friction ring gears in particular, in order to ensure the best possible pressing pressure for the continuously adjustable gear through the adjustment travel or the range of the transmission ratio.

In addition or as an alternative thereto, a method for operating a friction gear having at least one input member and at least one output member pressed against each other by means of a pressing apparatus is proposed that is characterized in that the pressing apparatus is operated with an operating condition-pressing force characteristic curve that has another average slope between an at rest position of the friction gear and a first operating condition than between the first operating condition and a second operating condition. Also, in addition or as an alternative thereto, a friction gear having at least two operating conditions is proposed in which at least one input member and at least one output member are pressed against each other by means of at least one pressing apparatus using therefor a pressing force varying as a function of the particular operating condition, said friction gear being characterized by a pressing apparatus having the already described operating condition-pressing force characteristic curve. Even irrespective of the other features of the present invention, such a method and such an arrangement respectively permit to increase operational economy of a friction ring gear.

More specifically, such a varying characteristic curve for the pressing apparatus is advantageous in any friction gear having at least one input member and at least one output member that are frictionally interacting. In this context, the term "frictionally" includes any interaction between two revolving gear members that provides no form-positive fit, non-destructive slippage being allowed to occur between the two gear members when the torque is too high. This term more specifically is also meant to include an interaction that acts between the two gear members through hydrostatic or hydrodynamic or electrostatic, electrodynamic or magnetic forces. Accordingly, the present invention also includes friction gears in which there remains between the actual mechanical gear members a gap filled with a fluid such as a gas or a liquid and in which the speed, the gap width, the pressure and the like are dimensioned such that this fluid causes the two gear members to interact through shear forces for example. Inasmuch, this varying characteristic curve is also suited for friction gears in which there are provided between the two gear members a medium or a plurality of media transmitting the interaction such as fluids or another gear member.

In all of these arrangements, the interaction between the two gear members is controlled for quite a large part by the forces acting onto the particular interacting surface of the gear members. As is known for example from the documents EP 0 878 641 A1 or EP 0 980 993 A2, the two gear members may be suitably locked together for this purpose, which could be ensured through suited bearings for example. Furthermore and as illustrated by various exemplary embodiments in these printed documents, there may be provided pressing apparatus that provide, in excess of a certain basic load, variable pressing forces as a function of the output torque so that high pressing forces may be generated at high output torques, this permitting to accordingly increase the transmittable torque of the friction gear. In accordance with the state of the art, such type arrangements however result in quite high losses in such type friction gears, this calling into question their profitability.

As already explained, input member and output member need not be directly connected; it may rather be envisaged to provide transmitting gear members or means for transmitting the frictional connection such as additional fluids or other interaction mechanisms. Thanks to the balance of forces prevailing in a gear, input member and output member may also be interchanged. Since however such type gears are often to be found in a complex drive train, this differentiation will however generally have to be maintained. For the rest, it is understood that the gear members may also be pressed against each other by degrees of freedom of these gear members that are directed in offset relation to each other as long as at least one component of the degrees of freedom used for pressing together or for pressing against each other the gear members is suitably directed onto the interacting surface of a corresponding gear member.

Friction ring gears of the invention can be operated under different operating conditions, taking into consideration different kinds of operating conditions. Such kinds of operating conditions could be input or output torques, rpm, forces or force ratios, pressures or even temperatures, times or the like as well as the measured variables that are proportional thereto. During operation of such a friction gear, the respective kinds of operating conditions are used under a great variety of operating conditions, with, depending on the concrete embodiment or implementation, some kinds of operating conditions being of mere minor importance or proportional to other readily measurable kinds of operating conditions.

A varying characteristic curve may be realized in addition or as an alternative thereto using a friction gear the pressing apparatus of which includes two pressing units. By such a pressing apparatus, which includes at least two components, the operating condition-pressing force characteristic curve may be adapted to desired requirements using quite simple means. This applies in particular to the various average ascending slopes of the operating condition-pressing force characteristic curve that have been described herein above. In this respect, the term "average slope" between two operating conditions or between an operating condition and an at rest condition describes a value that is determined by an averaged slope or by an averaged straight line of the first derivation in the corresponding interval of the operating condition-pressing force characteristic curve. By varying the ascending slope, one has the possibility to optimize the operating condition-pressing force characteristic curve in at least two respects with regard to the necessities in the drive. Thus, depending on the particular concrete operating condition, optimal conditions may be ensured, as far as practicable, with respect to the driving force between the two operating conditions so that, as far as practicable, the optimum pressing force is chosen with respect to the momentary operating condition. This permits to minimize losses while providing for an optimal performance of the friction gear. Adjustment of the characteristic curve between the first operating condition and the at rest condition permits, by contrast, a direct transition between these two conditions, so that basic loads and, as a result thereof, basic losses may also be minimized. It is thereby understood that this provision needs not achieve an optimal result on its own, although this may already be the case, depending on the ancillary conditions. Those skilled in the art will be thus given the possibility to improve the efficiency of such type friction gears. At need, they will compromise between further efficiency increasing measures and (possibly) higher costs.

It is more specifically advantageous if the two pressing units composing the pressing apparatus have different operating condition-pressing force characteristic curves. By combining the two characteristic curves, the overall characteristic curve of the pressing apparatus may be adapted accordingly in a clear and understandable manner.

Preferably, the two pressing units may each have a first share in the pressing force in the first operating condition and a second share in the pressing force in the second operating condition, with the difference between the first and the second share of the first pressing unit differing from the difference between the first and second share of the second pressing unit. A system is thus provided in which the respective pressing units contribute to different extents to the overall pressing force of the pressing apparatus in the respective operating conditions, this permitting to readily influence the characteristic curve of the entire pressing apparatus in terms of construction.

Irrespective of the other features of the present invention, the two pressing units may hereby be configured to be acting in parallel or in series with respect to the detection of the operating condition and/or to the pressing force. As a result thereof and through suited transmission ratios where coupling is appropriate, the overall characteristic curve of the pressing apparatus can be readily adapted to the existing requirements.

It is possible to adapt an operating condition-pressing force characteristic curve for such a pressing apparatus within quite wide limits through suited curve paths or similar provisions. Usually however, this presents the disadvantage that external influences such as tolerance, clearance, thermal expansion and the like cause the characteristic curve to be displaced so that said characteristic curve is no longer correctly followed as a function of the corresponding operating condition. In those cases in particular, it is no longer ensured that a change in the operating condition also effects the desired change in the pressing force. For this reason, and also irrespective of the other features of the present invention, it is proposed that at least one pressing unit, preferably the two or all pressing units, comprise an operating condition-pressing force characteristic curve having a substantially constant slope. Such an arrangement is quite insensitive to problems of tolerance or to the afore mentioned failures since, with each pressing unit accordingly designed, an external failure is not relevant inasmuch as, because of the constant slope of the respective one of the characteristic curve, a change in the operating condition effects the same change in the corresponding pressing force, irrespective of failures.

Accordingly, such a solution is particularly advantageous if friction gears are used that have pressing apparatus the overall characteristic curve of which deviates from a straight line. In this context it is understood that the term "substantially constant slope" is to be construed with respect to the tolerances otherwise anyway existing in the system and to the other accuracy requirements in the entire drive train so that in this respect the term of "constancy" of a slope is not to be understood in a narrower sense than necessary for the overall accuracy and overall tolerance of the system respectively.

It is preferred that the pressing units be coupled together, with said coupling being configured to be mechanical or hydrodynamic or hydrostatic. This also applies in particular to the case in which the pressing units are provided separately on a respective one of the gear members. More specifically in the case of a pressing apparatus or pressing unit provided on the input side, there is the possibility to take into consideration an input load, which may more specifically be achieved in that the pressing force is reduced under partial loads, this permitting to reduce the overall loss of the friction ring gear so that such a pressing apparatus or pressing unit provided on the driving side is advantageous even irrespective of the other features of the present invention.

By coupling the pressing unit provided on the input side to the pressing unit provided on the output side, it is furthermore possible to reduce the pressing force under part load when the full load behavior is optimal so that the total loss may be minimized.

Various parameters of the particular friction gear can be used as the kind of operating condition. This could more specifically be an input torque, an output torque, the total load, occurring forces or other parameters that have already been mentioned herein above.

Checking of the output and/or input torque as well as, possibly, the total load, is particularly advantageous, as they are directly indicative of the forces occurring or required at the frictional connection between the two gear members.

Accordingly, it is advantageous if, for comparing the average slope between the at rest condition and the first operating condition and between the first and the second operating condition, the first operating condition is the lowest torque anticipated to occur under full load and the second operating condition the highest torque anticipated to occur under full load. Accordingly, for suitably dimensioning the characteristic curve, the necessary pressing force for the lowest torque anticipated to occur under full load and for the highest torque anticipated to occur under full load can be determined so that the corresponding characteristic curve may be directly configured as a straight line between these two points.

The advantage of the characteristic curve being configured to be a straight line has already been discussed in detail herein above. Likewise, between the at rest condition or the minimum pressing force required for the gear not to slip and/or not to rattle while ensuring starting and the pressing force required at the lowest torque anticipated to occur under full load, there may be drawn a straight line so that again the tolerance insensitivity achieved using characteristic curves with a constant slope can be made use of. Choosing this characteristic curve offers the great advantage that a basic load is limited to the absolutely necessary minimum so that the efficiency of such a friction gear is also optimized in this respect.

It may be advantageous to vary the two pressing units with respect to their respective pressing force or with respect to their share in the total pressing force of the pressing apparatus through various kinds of operating conditions. Accordingly, the pressing force of one pressing unit may for example be varied with respect to the input torque or the total load and that of another pressing unit with respect to the output torque. In this manner, the overall behavior of the friction gear can be widely adapted to the given requirements so that it may be optimized in particular with respect to its efficiency.

Further advantages, properties and objects of the present invention will be explained herein after with reference to the following description and the appended drawing. In the drawing:

FIG. 7 is a schematic illustration of the force ratios in a possible alternative;

FIG. 8 is a schematic illustration of the force ratios in a further alternative;

FIG. 9 is a schematic illustration of the force ratios in another exemplary embodiment;

FIG. 20 shows an alternative characteristic curve of the inner ball unit of the arrangement as shown in the FIGS. 14 and 15;

FIG. 21 shows a characteristic curve of the outer ball unit of the arrangement as shown in the FIGS. 14 and 15 adapted to the characteristic curve as shown in FIG. 20;

FIG. 22 shows the characteristic curve of the entire pressing unit, taking under consideration the characteristic curves as shown in the FIGS. 20 and 21 of the arrangement as shown in the FIGS. 14 and 15;

Figure 1:
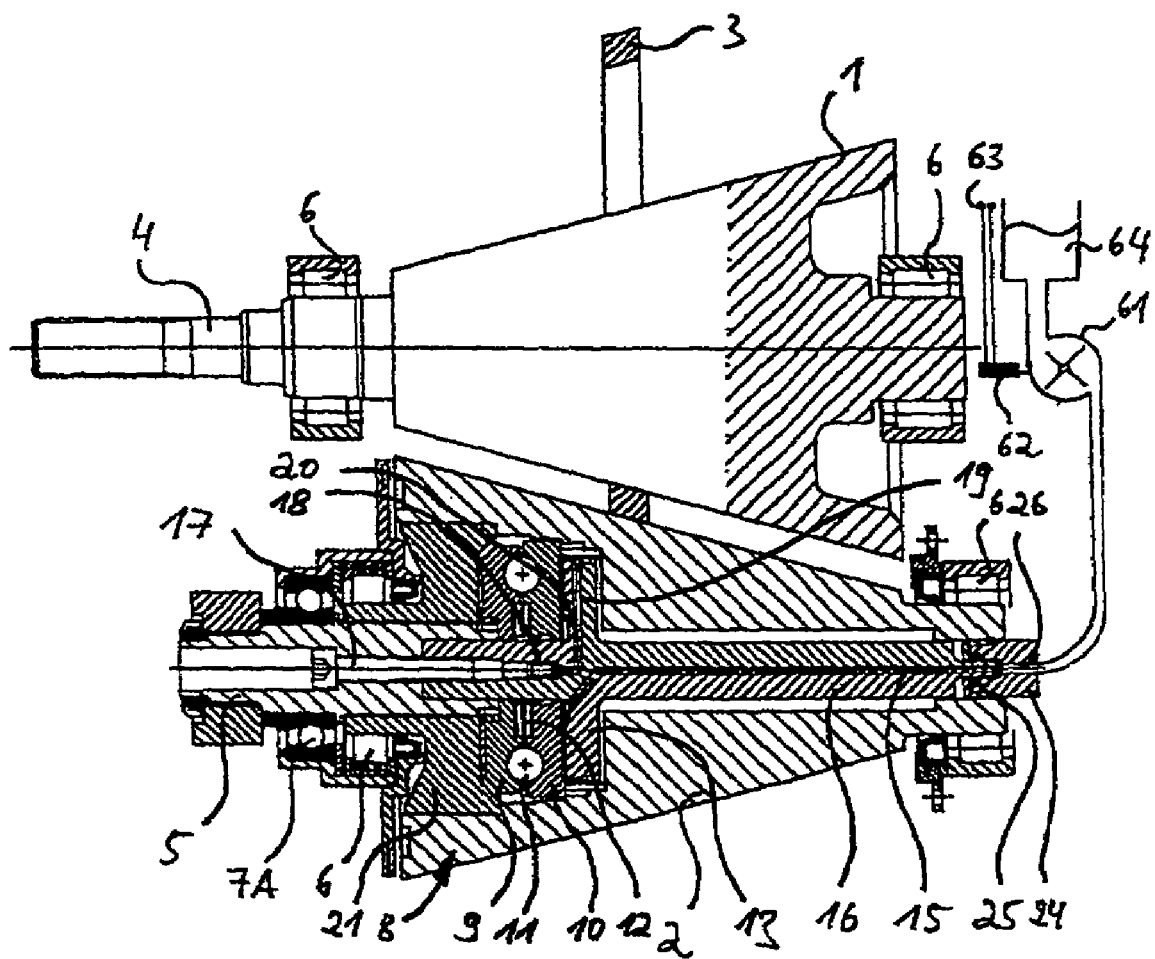
FIG. 1 shows a schematic sectional view illustrating a first gear of the invention with a pressing apparatus.

The gear as shown in FIG. 1 includes an input bevel gear 1 and an output bevel gear 2 interacting together in an actually known manner through an adjustable friction ring 3. The input bevel gear 1 is thereby operatively connected to a drive shaft 4 and the output bevel gear 2 to a driven shaft 5. The bevel gears 1, 2 of this exemplary embodiment are carried on cylindrical roller bearings 6 in the radial direction. Furthermore, in this exemplary embodiment, the bevel gears 1, 2 are locked together in the axial direction by four point contact bearings 7A so that the required pressing forces can be applied for transmitting torque, through the friction ring 3, from the input bevel gear 1 to the output bevel gear 2 and reverse. The axial support of the input bevel gear 1 is not explicitly illustrated in the appended FIGS. but could also be achieved through a four point contact bearing 7A or through an axial cylindrical roller bearing or the like for example.

For locking or to generate the required pressing forces, a pressing apparatus 8 is moreover provided between the driven shaft 5 and the output bevel gear 2, with the input shaft 4 being directly connected to the input bevel gear 1 in this exemplary embodiment. The pressing apparatus 8 is capable of varying the axial distance between the output bevel gear 2 and the bearing 7A on the driven shaft 5 or of generating accordingly varying pressing forces in the locked state.

It is understood that rather than the bearings 6 and 7A other bearing arrangements such as axial angular contact ball bearings, axial self-aligning ball bearings, axial deep groove ball bearings, taper roller bearings or similar bearings or kinds of bearings could be combined together to lock together and to carry the bevel gears 1, 2 in the radial direction on the one side and sufficiently in the axial direction on the other side. Likewise, hydrodynamic or hydrostatic bearings could find application.

In operation, the friction ring 3 can be adjusted in a manner that will not be described in closer detail herein but that is known in the art so that the transmission ratio of the gear can be chosen. It is understood that in operation the entire arrangement is or may be subjected to different torques in particular. Since the operative connection between the two bevel gears 1, 2 is a frictional connection, it is preferred that the pressing forces be chosen to be sufficiently high so as to cause controllable slippage on the friction ring 3. On the other side, unnecessarily high pressing forces would result in a quite high basic load which in turn would impair the efficiency of the friction gear. Controllable and in particular also sufficient high slippage may be advantageous to facilitate regulation of the gear since rpm would then be the only necessary control variable with the torques being accordingly adjusted and transmitted via the pressing force.

In order to allow for suited adjustment of the pressing force, torque dependent regulation of the pressing force is chosen in the present exemplary embodiment, although the pressing force may also be chosen depending on other operating conditions, as will be discussed herein after. As is evident from FIG. 1, the output torque is more specifically chosen as the control variable for regulating the pressing force.

In the instant exemplary embodiment, the pressing apparatus 8 includes two screw-down disks 9, 10 comprising guide paths for balls 11 and being supported on the one side via the screw-down disk 9 by the shaft 5 and on the other side via the screw-down disk 10 by the output bevel gear 2. The screw-down disks 9 or 10 are thereby configured such that the torque is transmitted from the driven bevel gear 2 onto the screw-down disk 10, through the balls 11 onto the screw-down disk 9 and from there onto the driven shaft 5. The guide paths for the balls 11 are thereby configured in such a manner that an increased torque causes the two screw-down disks 9, 10 to rotate with respect to each other which in turn causes the balls 11 to be displaced along the guide paths, with the screw-down disks 9 and 10 being urged apart as a result thereof. In an idealized arrangement that is inherently rigid no movements are performed; as a result of the oblique guide paths, the torque directly causes the pressing force to increase. In this fashion, the pressing device 8 generates a pressing force that is dependent on the output torque.

The advantage of this arrangement is that, as a mechanical apparatus, it has extremely short reaction times and is capable of reacting very well in particular to impacts in the drive train located on the output side.

In parallel to the balls 11, the plates 9, 10 are urged apart by a spring arrangement 12 imparting a certain basic load to the pressing apparatus 8.

Figure 4:
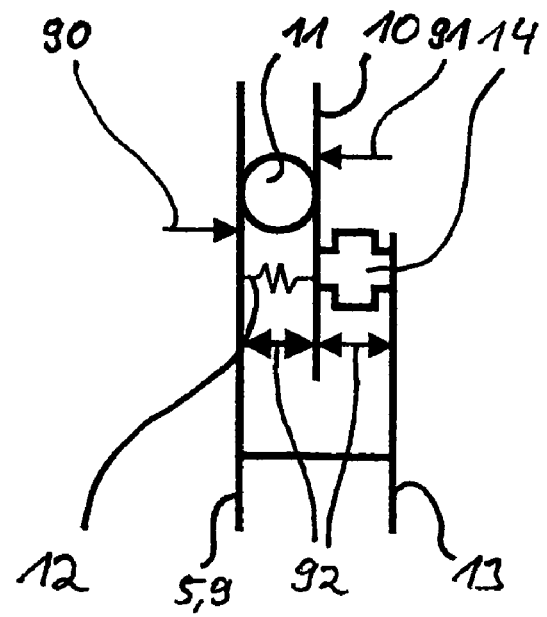
FIG. 4 is a schematic illustration of the force ratios in the embodiments as shown in FIG. 1.

Unfortunately, the characteristic curve of the arrangement formed from the plates 9 and 10 and from the balls 11 and the spring 12 can only be optimized to a certain extent. Accordingly, the characteristic curve comprises portions in which the pressing force is provided in excess. The total loss of the corresponding gear is considerably increased as a result thereof. For this reason, the arrangement of FIG. 1 comprises a force compensation, in particular for part load portions. In this exemplary embodiment, this compensation is performed hydraulically, a pressure being hydraulically generated between a plate connected to the driven shaft 5 and the pressing plate 10, which counteracts the pressing force generated by the balls. In this fashion, the pressing force generated by the balls 11 and the spring 12, and which is in excess or not needed, can be hydraulically compensated by a counterforce generated by a component part 13 that is firmly connected to the driven shaft 5. The corresponding circumstances are schematically illustrated in FIG. 4 with the thickness of the arrows being indicative of the respective intensity of the forces. The hydraulic pressure 14 thus compensates a force of the balls 11 and of the spring 12 respectively that is too high so that the bearings 6, 7A are unnecessarily loaded. The arrow 90 hereby indicates external forces of the driven shaft 5, the arrow 91 external forces of the output bevel gear and the arrows 92 internal forces.

In the exemplary embodiment illustrated in FIG. 1, the hydraulic pressure 14 is provided via a hydraulic line 15 that is disposed in an additional shaft 16 firmly connected to shaft 5 through a screw 17. The screw 17 furthermore closes a fill port 18 which, in conjunction with a line 19 and an undercut 20, serves for the bubble-free filling of the hydraulic space while ensuring operational safety. On its end turned away from the driven shaft 5, the shaft 16 comprises a hydraulic seal so that the hydraulic pressure 14 can be readily built up and controlled from the outside as desired.

The arrangement as shown in FIG. 1 furthermore comprises a mounting body 21 through which the driven bevel gear 2 is radially carried. Through this mounting body 21, the pressing apparatus 8 can be readily mounted in the interior of the driven bevel gear 2.

Figure 2:
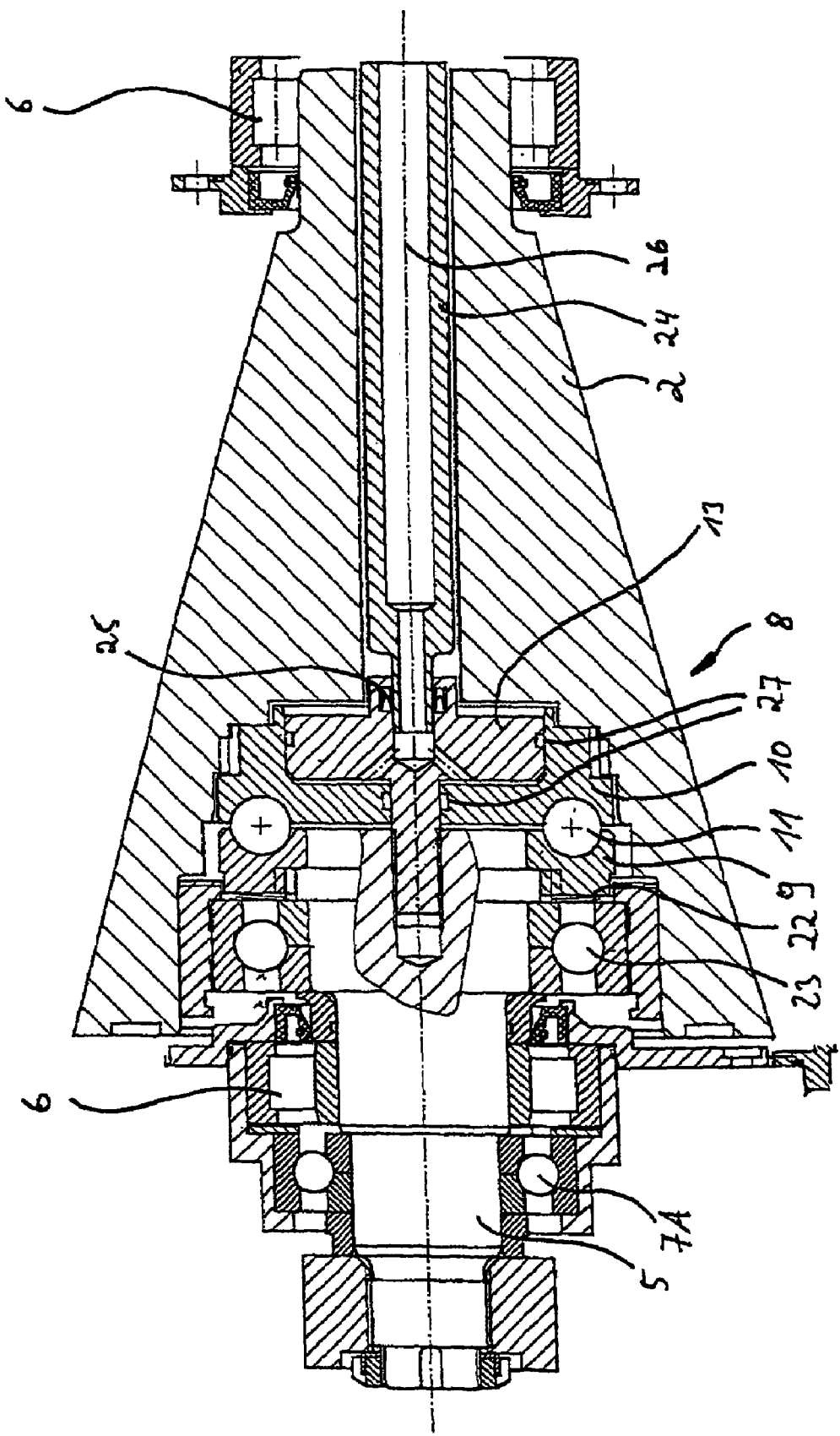
FIG. 2 shows the output bevel gear of a second gear with pressing apparatus of the invention in an illustration similar to FIG. 1.

The arrangement illustrated in FIG. 2 substantially corresponds to the embodiment as shown in FIG. 1 so that structural components having the same function bear identical reference numerals and will not be discussed explicitly again.

In this exemplary embodiment however, the basic load is not generated by a spring mounted in parallel but by a spring 22 mounted in series with the pressing apparatus 8 and being supported by the driven shaft 5, which in the present exemplary embodiment is achieved using a four point contact bearing 23 which on the one side transmits the pressing force between the screw-down disk 9 and the driven shaft 5 and on the other side serves to axially carry the driven bevel gear 2 with respect to the driven shaft 5.

Thereabove, the hydraulic supply 24 projects, as contrasted with the hydraulic supply 24 in the exemplary embodiment shown in FIG. 1, far into the driven bevel gear 2 so that the corresponding seal 25 is directly disposed on the component part 13 that is firmly connected to the driven shaft 5 and will be referred to herein after as counterplate 13. By applying a pressure onto the line 26 provided in the hydraulic supply 24, a hydraulic pressure 14 is built up between the counterplate 13 and the screw-down disk 10 for counteracting the pressing pressure generated by the balls 11, thus reducing the total pressing force of the pressing apparatus 8.

As is evident from FIG. 2, the counterplate 13 is screwed into the shaft 5 in this exemplary embodiment whereas in the exemplary embodiment as shown in FIG. 1 an additional screw having the above mentioned double function is used therefore. The hydraulic space provided between screw-down plate 10 and counterplate 13 is sealed against the outside through seals 27 (not shown in FIG. 1).

Figure 5:
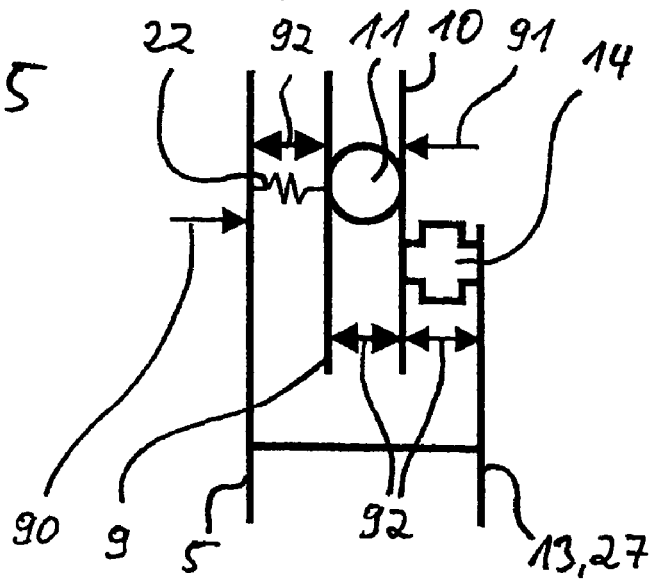
FIG. 5 is a schematic illustration of the force ratios in the embodiments as shown in the FIGS. 2 and 3.

As is evident from FIG. 5, the arrangement illustrated in FIG. 2 results in a functioning similar to that of the exemplary embodiment illustrated in the FIGS. 1 and 4. Here again, a compensating force is generated through the pressure 14 so that the total pressing force and, as a result thereof, the locking force acting on the bearings 6, 7A may be minimized through pressure 14.

Figure 3:
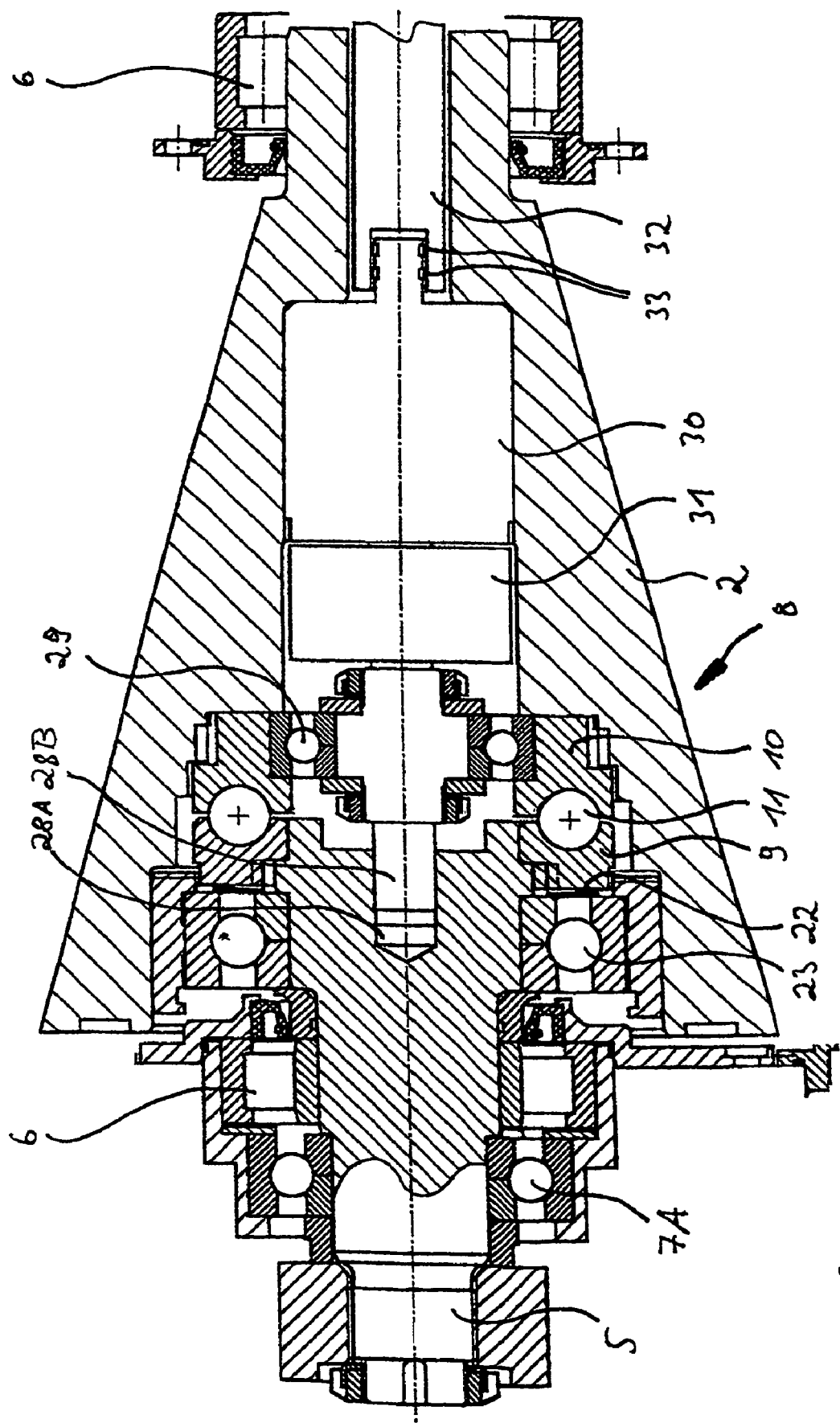
FIG. 3 shows the output bevel gear of a third gear with pressing apparatus of the invention in an illustration similar to FIG. 1.

Instead of a hydraulic arrangement, a motor-driven arrangement could be chosen for the pressure 14 in the second pressing apparatus part as illustrated by way of example in FIG. 3, with the exemplary embodiment of FIG. 3 corresponding for the rest to the exemplary embodiment shown in FIG. 2 and functioning as illustrated in FIG. 5.

This arrangement as well generates a basic load through a spring arrangement 22 connected in series that is carried on the driven shaft 5 by a four point contact bearing. For implementing the motor driven drive system of the second pressing apparatus part 14, there is provided a threaded bolt 28B in a threaded hole 28A of the driven shaft 5, said bolt being carried on the screw-down plate 10 and on the driven bevel gear 2 by a four point contact bearing 29, the function of the threaded hole 28A corresponding in this arrangement to the function of the counterplate 13. The threaded bolt 28b can be displaced with respect to the shaft 5 by a motor 30 that may be actuated through an electric line 32 and through slip rings 33 and by a gear 31, this permitting to generate a variable counterforce for counteracting the pressing force generated by the balls 11 and the spring 22.

Figure 6:
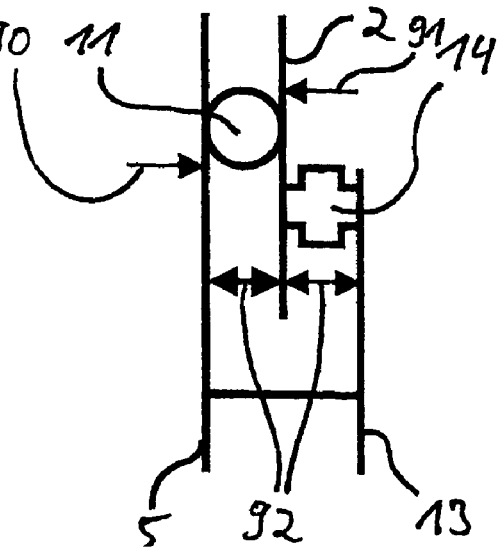
FIG. 6 is a schematic illustration of the force ratios in an alternative.

As outlined in FIG. 6, an arrangement of the invention can also be implemented without a spring arrangement generating a basic load. Schematic arrangements corresponding to the conditions as shown in FIG. 6 are illustrated in the FIGS. 10 and 11. Again, there is provided a pressing apparatus 8 in which a screw-down plate 9 is supported by the driven shaft 5 and comprises raceways for the balls 11. The corresponding raceways however are not provided, like in the exemplary embodiments shown in the FIGS. 1 through 5, in another screw-down plate, but directly within the driven bevel gear 2. Accordingly, the second pressing apparatus part 14 also acts directly on the driven bevel gear 2 via a pressure space 34. For the rest, the functioning corresponds to the functioning of the already discussed exemplary embodiments so that it will not be discussed in detail. In addition, it should be noted that in the exemplary embodiment shown in FIG. 10, the bevel gears 1, 2 are axially carried on axial cylindrical roller bearings 7B. Moreover, in this exemplary embodiment, the second pressing apparatus part 14 is primarily actuated as a function of the input torque, which is registered by means of the input shaft 4, a screw-down disk 35 connected to said input shaft 4, balls 36 as well a piston 37, which is non-rotatably linked to the driving bevel gear 1 but is axially displaceable, and hydraulically transmitted to the pressure space 34 via a line 38. The line 38 is hereby hermetically connected through leadthroughs 39 to the respective structural components rotating with the bevel gears 1, 2.

Beside the input torque actuation 40 formed by the component parts 35, 36, 37, the second pressing apparatus part 14 may also be actuated or controlled through a piston 41 as a function of further parameters.

Figure 10:
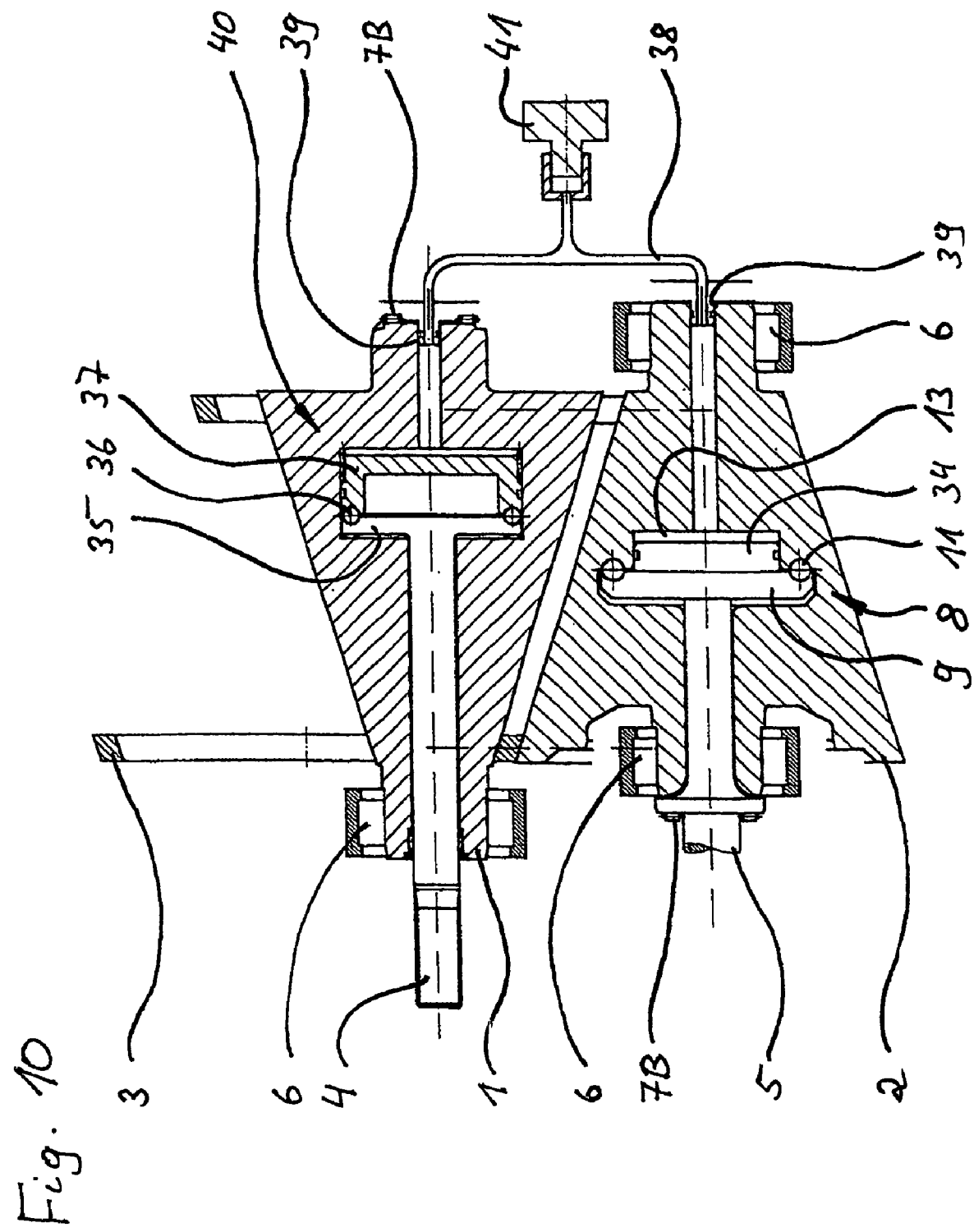
FIG. 10 is a schematic sectional view of the alternative outlined in FIG. 6 in an illustration similar to that in FIG. 1.
Figure 11:
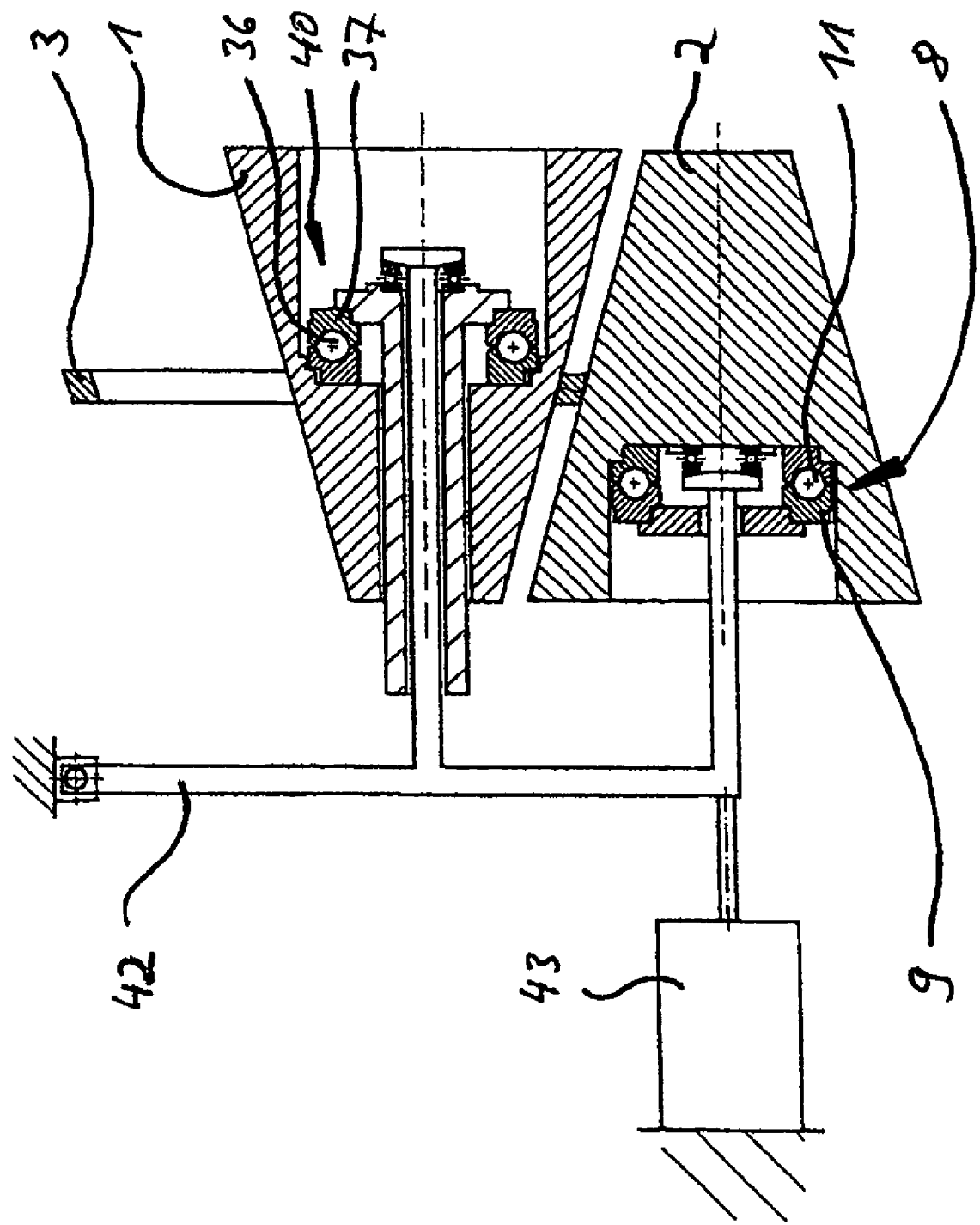
FIG. 11 is an alternative implementation of the alternative outlined in FIG. 6 in an illustration similar to that in FIG. 1.

A mechanical alternative to the embodiment shown in FIG. 10 is illustrated in FIG. 11, where the input torque detected is transmitted to the second pressing apparatus part through a lever arrangement 42. Furthermore, through a servo 43, further control variables can be made use of for regulating the second pressing apparatus part.

The second pressing apparatus part or the entire pressing apparatus can be actuated or regulated using different control variables. These more specifically can be the torque of the motor, the input rpm, the output rpm, the adjustment travel or the adjustment position of the friction ring 3, the temperature of the gear or of a gear oil, the wheel rpm or for example the ABS (antilock brake system) signal, an external impact detection or other parameters.

The corresponding measured values can be transmitted either hydraulically or by motor or by any other means to the pressing apparatus 8, as already discussed herein above. In hydraulic systems, this may be performed in particular by pumps such as gear pumps or by pumps already existing in an automotive vehicle and by a corresponding pressure regulation. Moreover, piston arrangements and electric motor systems could be envisaged.

More specifically, there may be provided a gear pump 61 driven by an electric motor 62 for delivering fluid from a reservoir 64. Through a voltage 63 applied to the electric motor 62, a torque may hereby be applied to the gear pump 61, said torque rotating said pump in such a manner that the fluid or rather the pressing apparatus 8 generates a counter pressure corresponding to the pressure resulting from the torque.

A similar functioning is illustrated in FIG. 7 in which the internal forces 92 are provided by means of balls 11 connected in parallel to a hydraulic pressure 14 and of a spring arrangement 12 connected in series thereto. The internal forces 92 are opposed by the external force 90 of the driven shaft 5 as well as by the external force 91 of the output bevel gear 2.

The alternative functioning shown in FIG. 8 includes an arrangement of balls 11 and of a 25 hydraulic pressure 14 connected in parallel thereto, with the balls 11 and the hydraulic pressure 14 effecting internal forces 92. The external force 90 of the driven shaft 5 and the external force 91 of the driven output gear 2 counter these internal forces 92. Like the arrangement shown in FIG. 6, the arrangement in FIG. 8 needs no additional spring element.

In the exemplary embodiment of FIG. 9, balls 11, the functioning of a hydraulic pressure 14 and of a spring element 12 are connected in parallel. This results in the internal forces 92 opposing the external force 90 and the external force 91.

Figure 12:
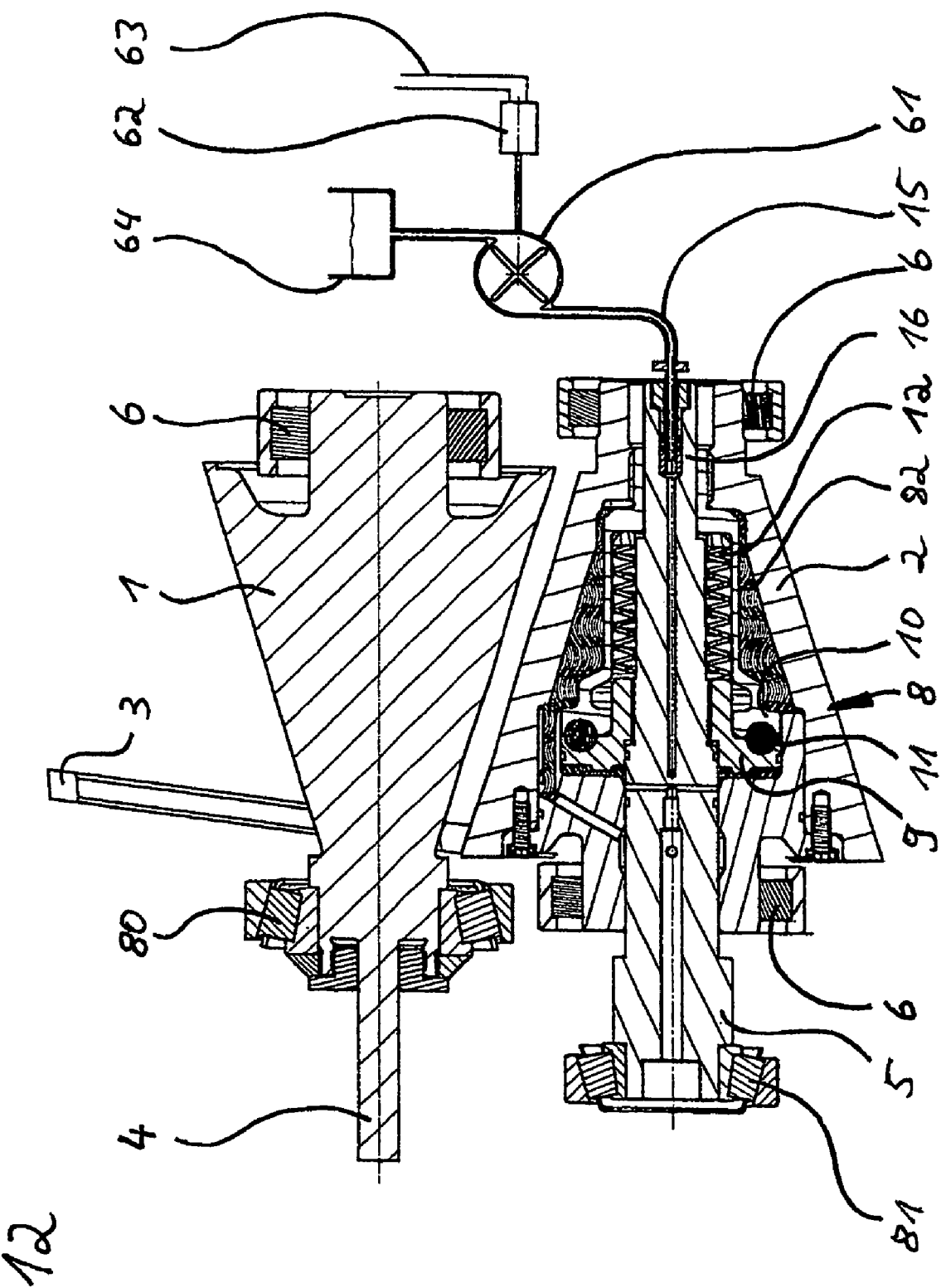
FIG. 12 is a schematic sectional view of a further gear with an alternative pressing apparatus.

The gear illustrated in FIG. 12 includes an input bevel gear 1 and an output bevel gear 2 that interact together through an adjustable friction ring 3. The input bevel gear 1 is operatively connected to a drive shaft 4 and the output bevel gear 2 to a driven shaft 5. In this exemplary embodiment, the input bevel gear 1 is carried on the one side by cylindrical roller bearings and on the other side by taper roller bearings 80. The taper roller bearings 80 are particularly suited for receiving not only radial forces but in addition thereto axial forces as well. In this exemplary embodiment, the output bevel gear 2 is merely carried on cylindrical roller bearings 6 with the driven shaft 5 of the output bevel gear 2 being additionally carried by means of taper roller bearings 81. The two bevel gears 1 and 2 are locked together in the axial direction in particular by the taper roller bearings 81 in such a manner that the required pressing forces can be applied to permit torque transmission from the input bevel gear 1 to the output bevel gear 2 and reverse via the friction ring 3.

For locking or for generating the required pressing forces there is furthermore provided between the driven shaft 5 and the output bevel gear 2 a pressing apparatus 8 with the input shaft 4 being also directly connected to the input bevel gear 1 in this exemplary embodiment. In this exemplary embodiment, the pressing apparatus 8 is also capable of varying the axial distance between the output bevel gear 2 and the taper roller bearing 81 on the driven shaft 5 or of generating accordingly varying pressing forces when in the locked state.

It is understood that, as already described herein above, the bearings 6, 80, 81 provided in this exemplary embodiment may also be replaced by, or combined with, other bearing arrangements in order for the bevel gears 1 and 2 to be carried in a locked state in the radial direction on the one side and sufficiently in the axial direction on the other side. Hydrodynamic or hydrostatic bearings may hereby be used.

The transmission ratio of the gear illustrated herein is selected by displacing the friction ring 3 so that different forces, more specifically different torques, are caused to act onto the overall arrangement. In order to allow for the pressing forces and, as a result thereof, the frictional connection between the two bevel gears 1 and 2 to be advantageously adapted to the various operating conditions, the pressing apparatus 8 includes two screw-down disks 9 and 10 which comprise guide paths for balls 11. The respective screw-down disks 9 and 10 are configured in such a manner that the torque is transmitted from the driven bevel gear 2 to the screw-down disk 10 through the balls 11 to the screw-down disk 9 and from there to the driven shaft 5. The guide paths for the balls 11 are thereby configured such that an increased torque causes the two screw-down disks 9 and 10 to rotate relative to each other, said rotation in turn causing the balls 11 to be displaced along the guide path which results in the screw-down disks 9 and 10 being urged apart. Ideally, rotation between the two screw-down disks 9 and 10 is not performed if the arrangement is substantially rigid. Due to the oblique guide paths, the torque hereby directly causes the pressing force to increase. In this way, the pressing apparatus 8 generates a pressing force that depends on the output torque. Advantageously, the arrangement described here has, as a mechanical apparatus, extremely short reaction times and is capable of reacting very well to impacts in the drive train located on the output side.

The screw-down disks 9 and 10 are urged apart parallel to the balls 11 by means of a spring arrangement 12 providing a certain basic load in the pressing apparatus 8. Since the characteristic curve of the present pressing apparatus 8 can only be optimized to a limited extent, the pressing apparatus 8 comprises a force compensation, for part load ranges in particular. In this exemplary embodiment, this occurs hydraulically, a pressure being hydraulically generated between a plate connected to the driven shaft 5 and the screw-down disk 10, said pressure counteracting the pressing force generated by the balls 11 and the springs 12. In this fashion, the excess or unnecessary pressing force generated by the balls 11 and the springs 12 can be hydraulically compensated for.

The pressure is provided through a hydraulic line 15 disposed in an additional shaft 16. Between the pressing apparatus 8 and the output bevel gear 2 there is provided an oil space 82. The oil disposed in said oil space 82 permits to better accommodate centrifugal forces acting in particular onto the oil in the pressing apparatus 8. In order to have an amount of oil large enough to regulate the pressing apparatus 8 there is provided a reservoir 64. Through a voltage 63 applied to the electric motor 62, a torque can be hereby applied to a pump 61, said pump 61 being thus adjusted in such a manner that the fluid or rather the pressing apparatus 8 generates a counter pressure corresponding to the pressure resulting from the torque.

Figure 13:
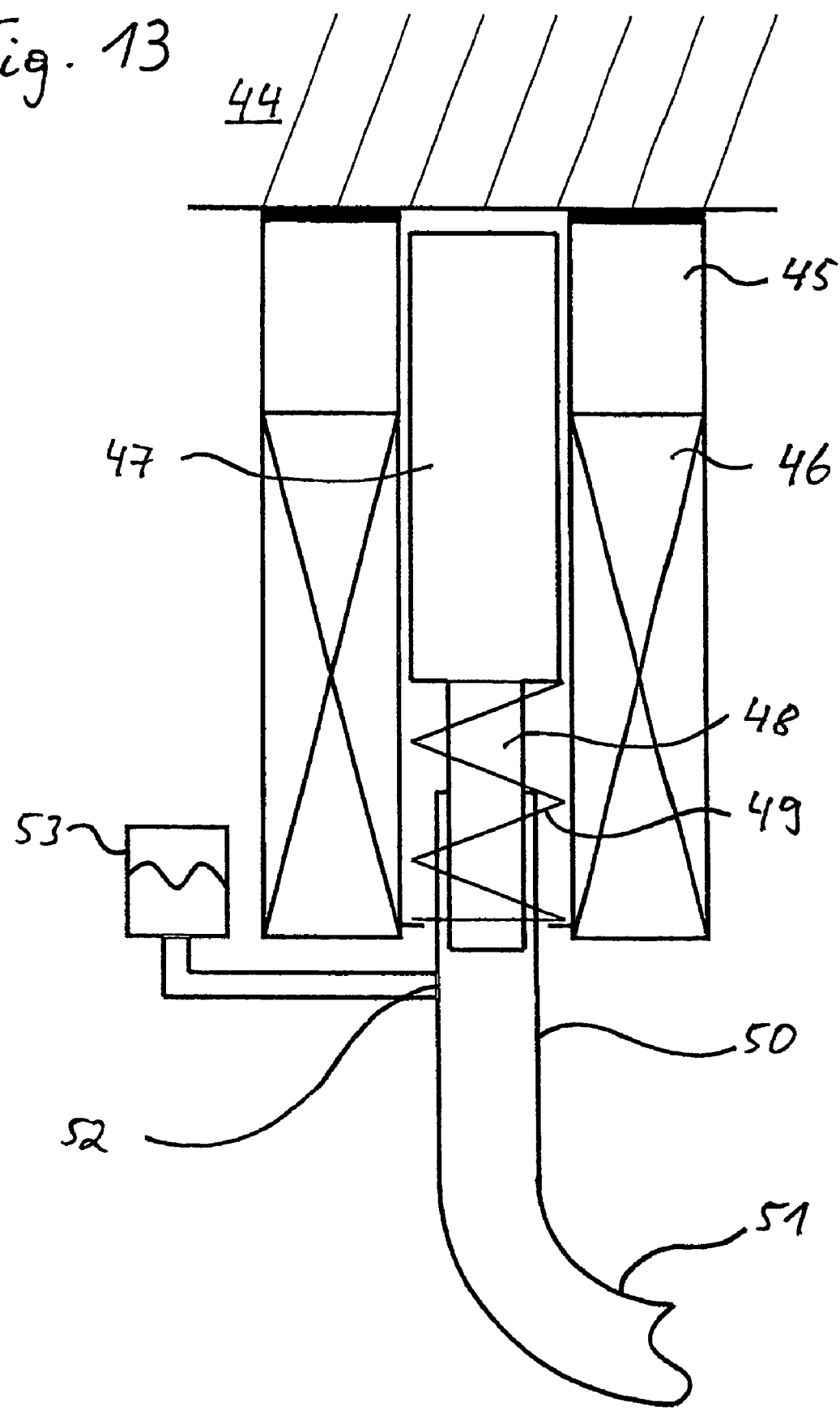
FIG. 13 shows a hydraulic actuation for a gear of the invention.

The example illustrated in FIG. 13 is a suited alternative in which there is provided on a casing 44, via a spacer 45, a coil 46 inside of which there is disposed a core 47 with a piston 48 that is pressed into the casing 44 by means of a spring 49. If current is applied to the coil 46, the core 47 is pushed against the force of the spring 49 into the center of the coil 46 so that the piston 48 is pushed into a cylinder 50, thus generating in said cylinder 50 and in a line 51 adjoining therewith a variable pressure as a function of the tension applied to the coil 46. The line 51 may for example be connected to the supply 26 of the exemplary embodiments as shown in the FIGS. 1 and 2 or to the line 38 of the exemplary embodiment shown in FIG. 7.

In the cylinder 50 there is provided a port 52 that is hermetically sealed in the first place during a forward movement of the piston 48. This port 52 is connected to an overflow/refill port 53 so that hydraulic liquid can be refilled or filled into the overall arrangement in a relaxed state in order to counteract for example a leakage or an overpressure resulting from external influences. It is understood that such an electric actuation of a hydraulic piston and/or such a leakage protection may advantageously find application even irrespective of the other features of the present invention.

The friction gear explained together with its characteristic curves and illustrated in the FIGS. 14 through 22 comprises an input bevel gear 101 and an output bevel gear 102 that are interacting together through an adjustable friction ring 103. The input bevel gear 101 is thereby operatively connected to a drive shaft 104 and the output bevel gear 102 to a driven shaft 105. In this exemplary embodiment, the bevel gears 101, 102 are carried on cylindrical roller bearings 106 (only schematically illustrated in FIG. 14) in the radial direction. Furthermore, in this exemplary embodiment, the bevel gears 101, 102 are locked together in the axial direction through axial cylindrical roller bearings 107 so that the necessary pressing forces can be applied for transmitting torque through the friction ring 103 from the input bevel gear 101 to the output bevel gear 102.

For locking or for generating the necessary pressing forces, there is furthermore provided a pressing apparatus 108 between the driven shaft 105 and the output bevel gear 102, the input shaft 104 being directly connected in this exemplary embodiment to the input bevel gear 101. The pressing apparatus 108 is capable of varying the axial distance between the output bevel gear 102 and the axial cylindrical roller bearing 107 on the driven shaft 105 or of generating accordingly varying pressing forces resulting from a spring arrangement 109 in the locked state.

It is understood that rather than the bearings 106 and 107 other bearing arrangements such as axial angular contact ball bearings, axial self-aligning ball bearings, axial deep groove ball bearings, taper roller bearings or similar bearings or kinds of bearings could be combined together to lock together and to carry the bevel gears 101, 102 in the radial direction on the one side and sufficiently in the axial direction on the other side. Likewise, hydrodynamic or hydrostatic bearings could find application.

In operation, the friction ring 103 can be adjusted in a well-known manner that will not be discussed in closer detail herein and the transmission ratio of the gear be chosen in this way. It is understood that in operation the overall arrangement is more specifically subjected to different torques. As the operative connection between the two bevel gears 101, 102 is a frictional connection, it is preferred that the pressing forces be chosen so as to allow controllable slippage to occur on the friction ring 103. On the other side, unnecessary high pressing forces would result in a quite high basic load, which in turn would impair the efficiency of the friction gear. For this reason, a torque dependent pressing force regulation is chosen in the present exemplary embodiment although the pressing force could also be chosen as a function of other operating conditions. As is evident from the FIGS. 14 and 15, the output torque is chosen as the control variable for regulating the pressing force, although other kinds of operating conditions such as the total load or the input torque could be used therefore as will become obvious from the exemplary embodiments that will be discussed below.

Figure 15:
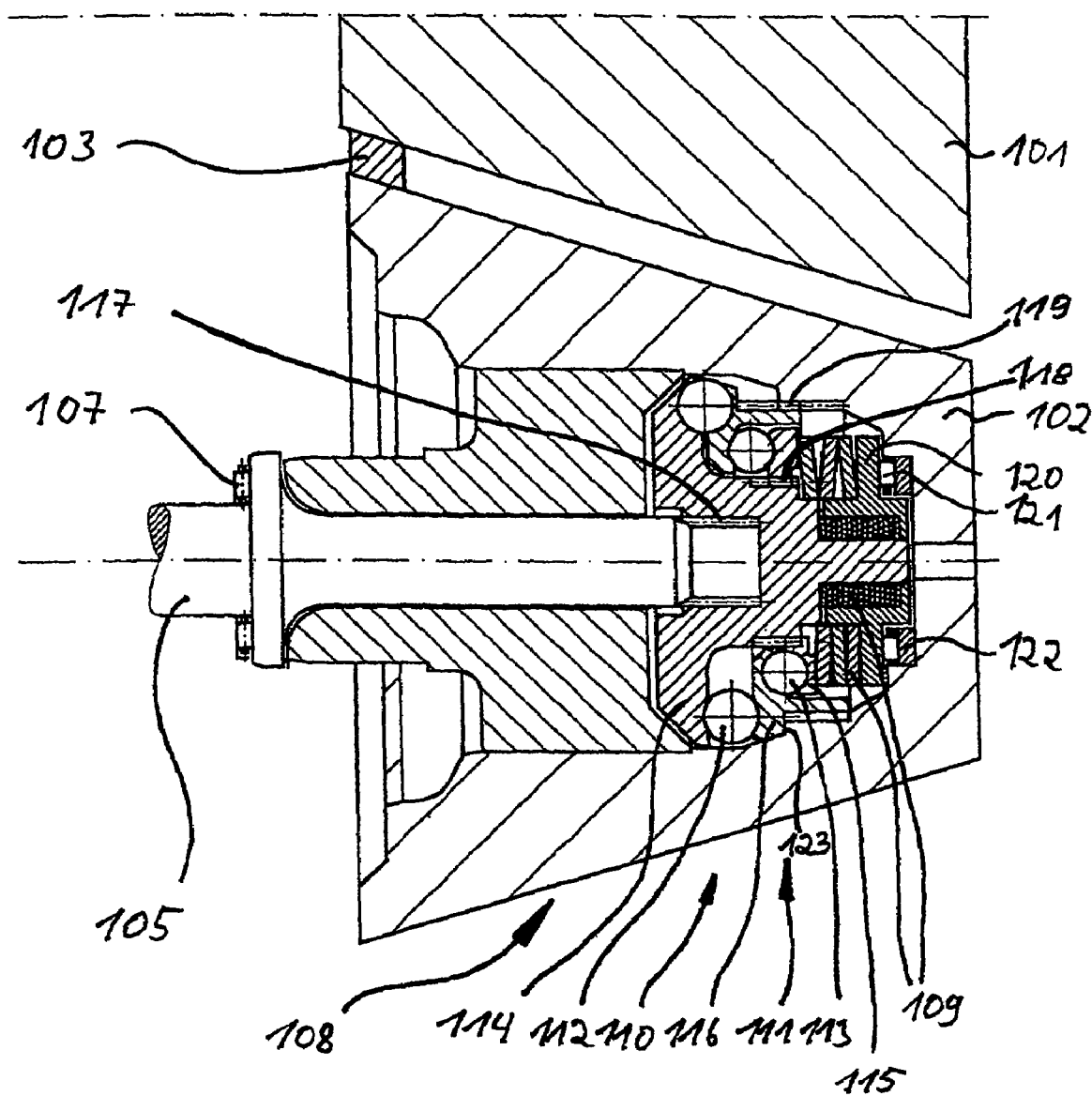
FIG. 15 is a schematic detail view of FIG. 14.

In the present exemplary embodiment, the pressing apparatus 108 includes two pressing units 110 and 111 that are connected in parallel with respect to their torque measurement and in series with respect to the pressing force they apply and that are represented by internal balls 112 or external balls 113 respectively (see FIG. 15). The balls 112, 113 each roll in raceways provided in pressing plates 114, 115 and 116 respectively mounted on the side of the bevel gear and on the side of the shaft. In this exemplary embodiment, the pressing plates 114 and 115 provided on the side of the shaft are disposed so as to be non-rotatable with respect to the driven shaft 105 whereas the pressing plate 116 disposed on the side of the bevel gear is disposed so as to be non-rotatable with respect to the driven bevel gear 102. On the other side, the pressing plates 114, 115, 116 are carried on corresponding sliding bearings 117, 118, 119 so as to be axially displaceable on these respective structural components.

Whereas a torque is thus transmitted from the driven output gear 102 through bearing 119 to the pressing plate 116, from there through the balls 112, 113 and through the pressing plate 115 and bearing 118 to the pressing plate 114 and from the pressing plate 114 through bearing 117 to the driven shaft 105, the pressing plates 114, 115, 116 are capable of being displaced in the axial direction against the force of the springs of the spring arrangements 109 and against a pressing bearing 120 that is supported by the driven bevel gear 102 through an axial cylindrical roller bearing 121 and a bearing plate 122, thus generating a torque dependent pressing force as a function of the raceways. In this respect, the FIGS. 14 and 15 show, in the upper border region of the pressing apparatus 108, the arrangement at low torque whereas the lower region represents the arrangement at high torque, with the lower region showing that the pressing plate 116 rests against a shoulder 123 of the driven bevel gear 102 at higher torques so that the characteristic curve of the overall arrangement may be readily influenced as a function of the torque.

Figure 14:
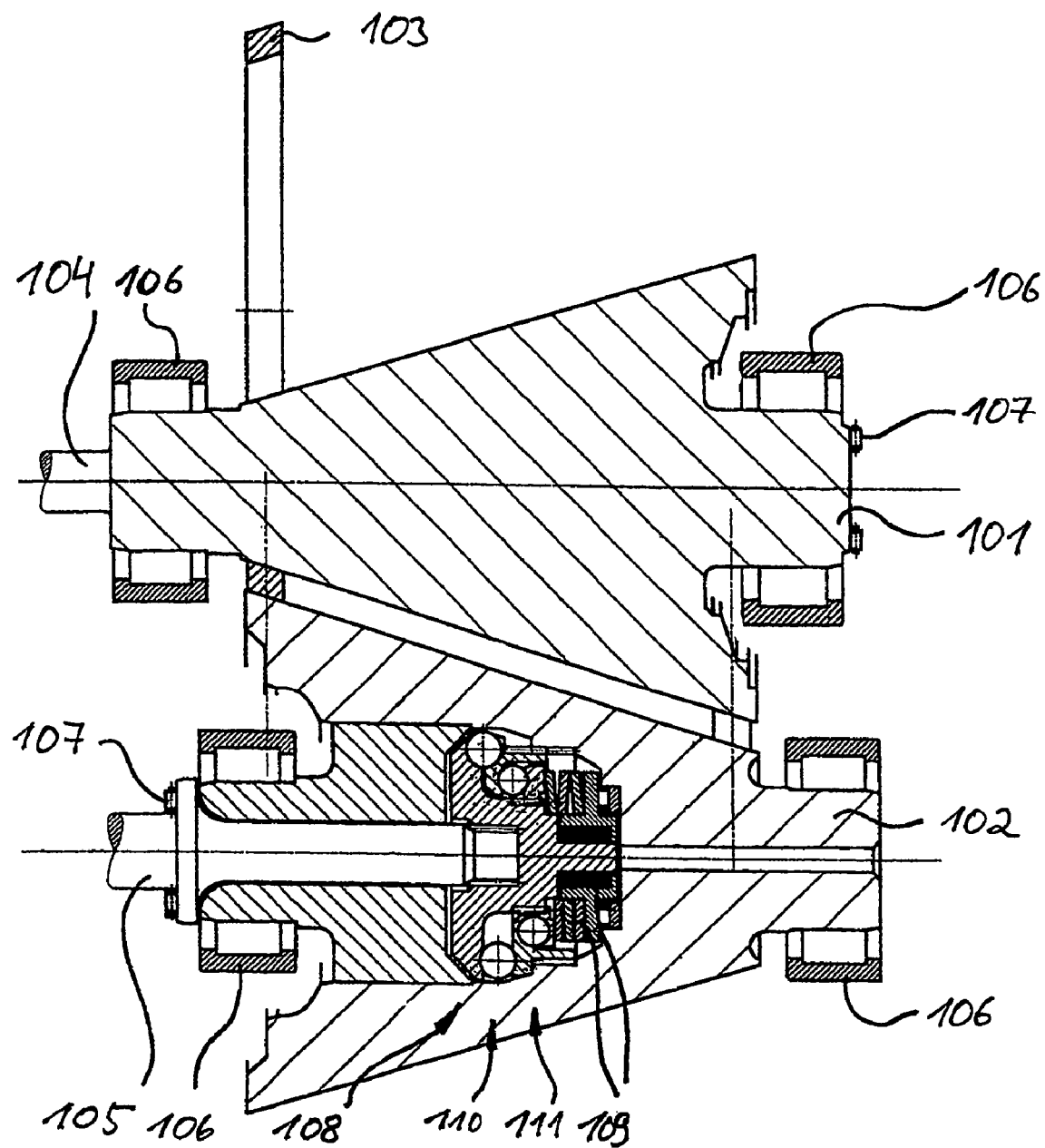
FIG. 14 shows a friction gear of the invention in a schematic sectional view.
Figure 16:
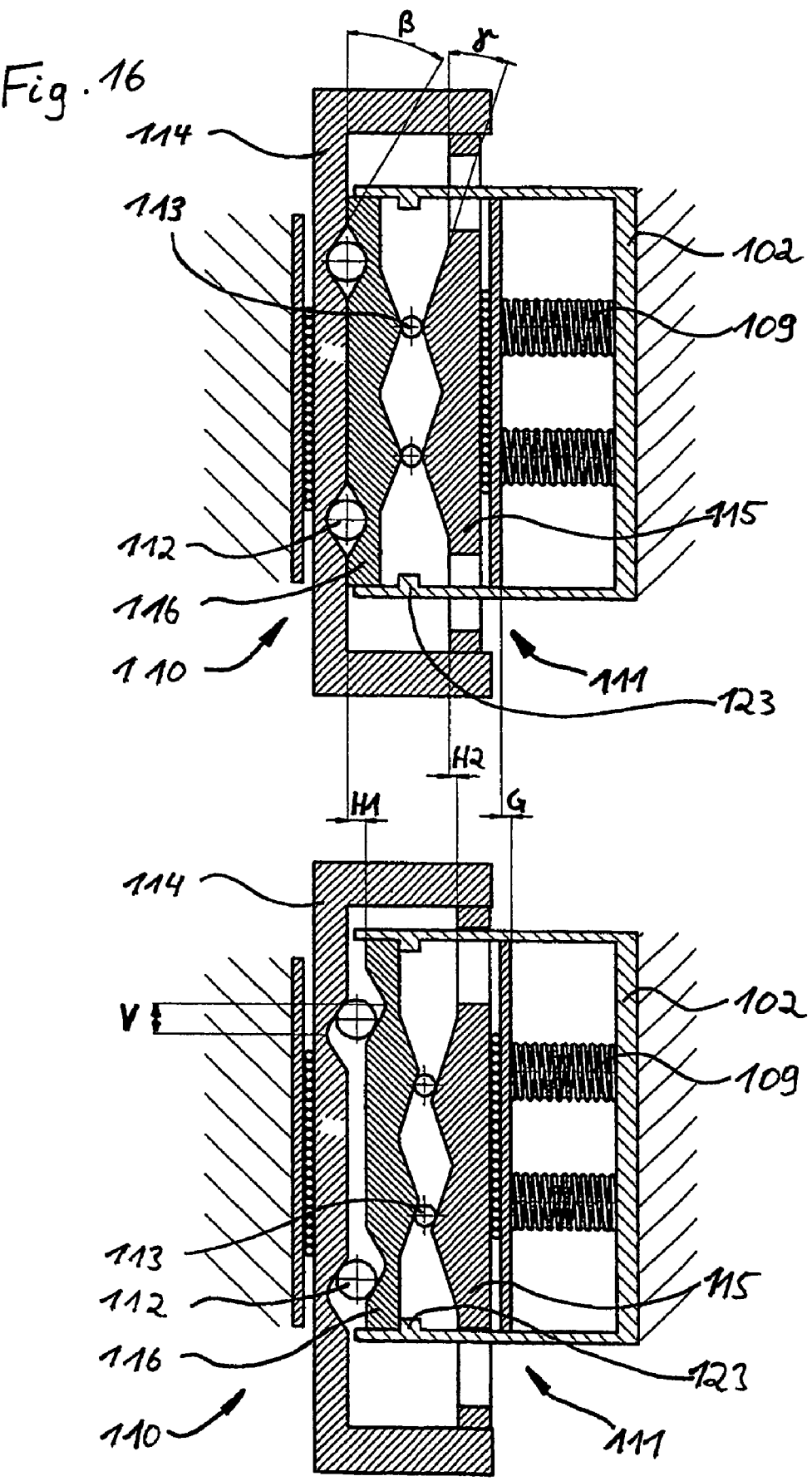
FIG. 16 is a schematic illustration of the functioning of the pressing apparatus shown in the FIGS. 14 and 15.

FIG. 16 hereby schematically shows in a planar manner the cooperation of the two pressing units 110 and 111, with structural components having the same function as the structural components shown in the FIGS. 14 and 15 having been labelled with identical reference numerals. As is obvious, the balls 112, 113 roll in raceways designed at different inclines P and y. At need, more complex raceways could also find application, with linear races being particularly advantageous for reliability reasons, for example to prevent clearance or thermal effects. At a given displacement or at a given torque as illustrated for example in the lower portion of FIG. 16 by means of an adjustment travel V with respect to the arrangement in the upper portion of FIG. 16, these raceways each result in a respective stroke H1 and H2, which yield a total stroke G. The stroke H1 is limited by the limit stop so that the total stroke G does not depend linearly on the adjustment travel V.

Figure 17:
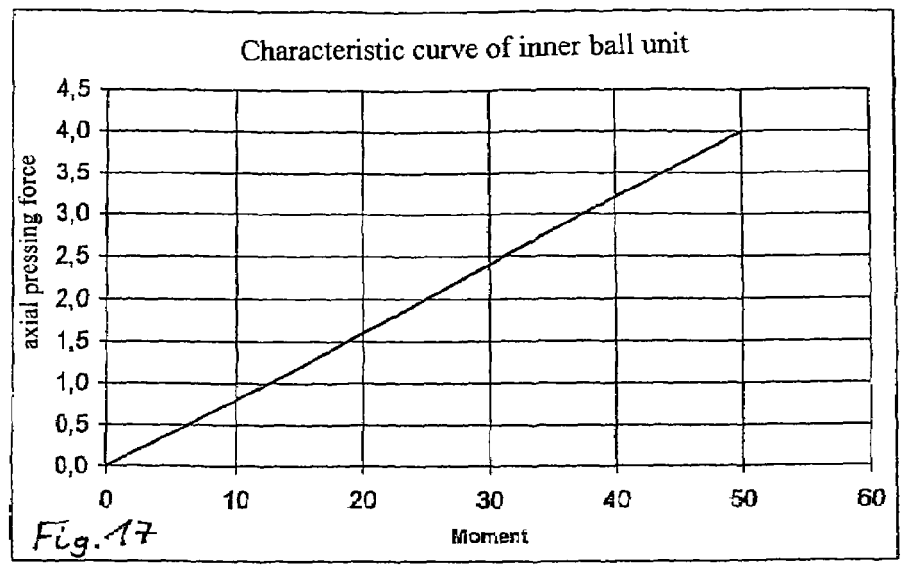
FIG. 17 shows the characteristic curve of the inner ball unit of the arrangement as shown in the FIGS. 14 and 15.
Figure 18:
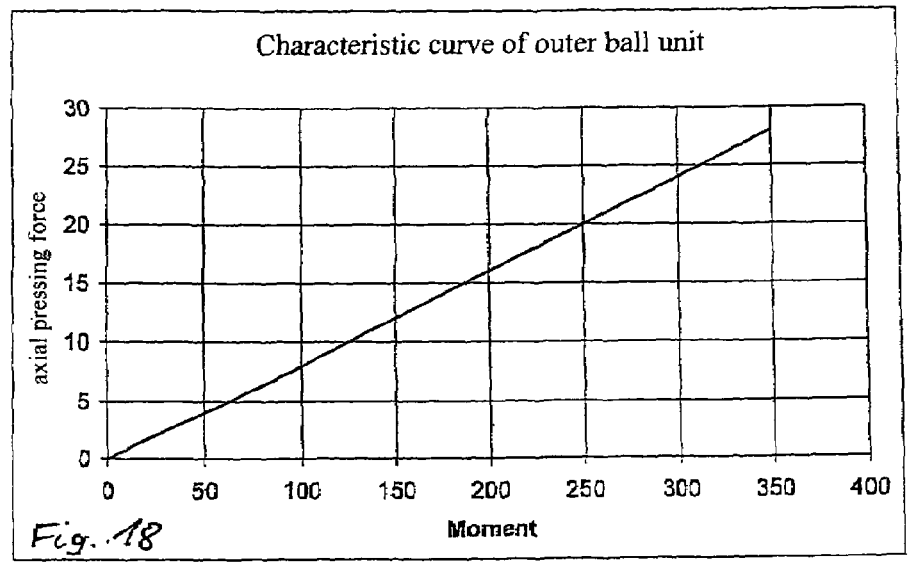
FIG. 18 shows the characteristic curve of the outer ball unit of the arrangement as shown in the FIGS. 14 and 15.
Figure 19:
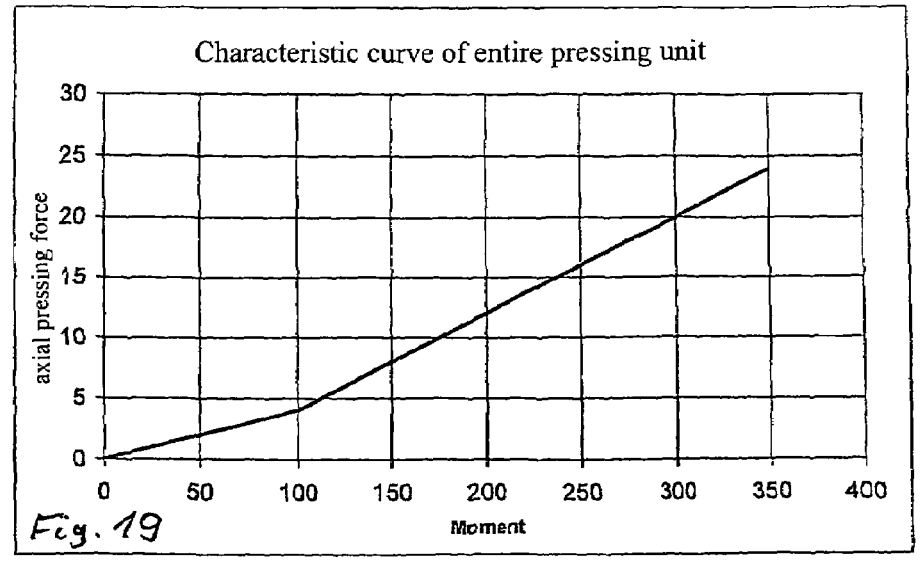
FIG. 19 shows the characteristic curve of the entire pressing unit of the arrangement as shown in the FIGS. 14 and 15.

The raceways may for example be designed so as to yield the characteristic curves illustrated in the FIGS. 17 and 18. Because of the torque dependent parallel connection, the characteristic curve illustrated in FIG. 19 is obtained, whereas because of the parallel connection with respect to the torque the couples are added and because of the connection in series with respect to the axial pressing force, the pressing force is the same in the two pressing units. As it reaches the shoulder 123, only the characteristic curve of the outer pressing unit 111 contributes to the entire characteristic curve.

The FIGS. 20 through 21 show another characteristic curve design with the negative slope of the inner pressing unit resulting in a particularly desirable entire characteristic curve (FIG. 22).

As is evident from the FIGS. 17 through 22, the pressing units in the present exemplary embodiments respectively comprise an operating condition-pressing force characteristic curve and a torque-pressing force characteristic curve having a substantially constant slope. The use of two pressing units permits to realize a characteristic curve adapted to the respective requirements in spite of these substantially constant slopes. This is possible inter alia because the two pressing units 110, 111 have a first share in the pressing force at a first torque and a second share in the pressing force at a second torque, with the difference between the first and the second share of the first pressing apparatus 110 differing from the difference between the first and the second share of the second pressing apparatus 110.

Figure 23:
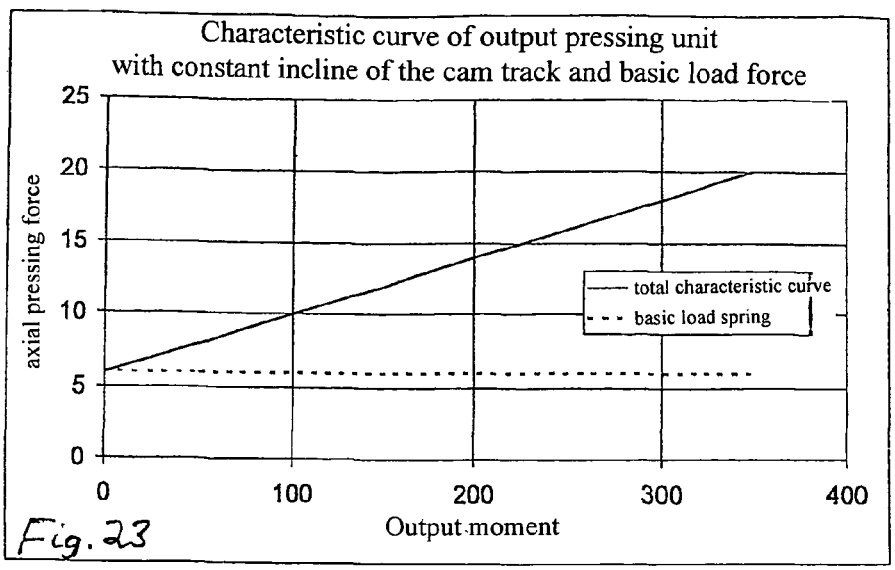
FIG. 23 shows a possible characteristic curve of a pressing apparatus.
Figure 24:
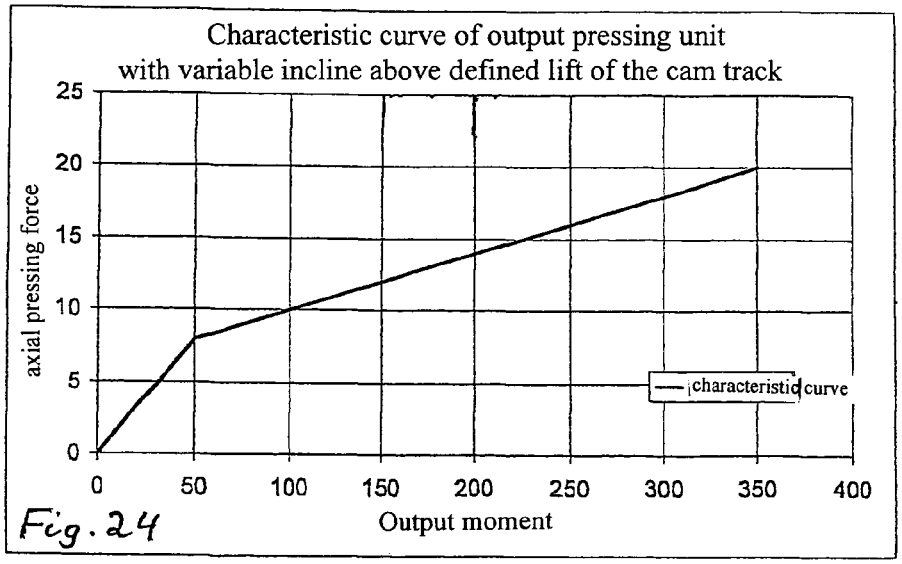
FIG. 24 shows another possible characteristic curve of a pressing apparatus.

As a rule, friction gears are operated at a certain operating interval with respect to different kinds of operating conditions. With respect to the pressing force, the requirement usually is that at the lower end of this interval a certain first pressing force and at the upper end of this interval a higher pressing force is to be applied. In order to prevent problems from arising with respect to possible tolerances, it may be advantageous to provide a constant slope of the operating condition-pressing force characteristic curve between these two points in the operational interval. Under these conditions, the characteristic curve illustrated in FIG. 23 may for example be implemented using a pressing apparatus including but one pressing unit even if the operational interval merely ranges between 50 Nm and 350 Nm. As a result however, a considerable basic load remains in the system, said load notably reducing the efficiency. This may be met with giving the raceway a varying slope as illustrated in FIG. 24. The characteristic curve hereby preferably comprises in the operational range between 50 Nm and 350 Nm a substantially constant slope and drops below this operational range to a pressing force of near 0 N, more specifically of below 1 N, in the at rest condition (0 Nm). The basic load in the overall system is thus considerably reduced, this permitting to increase overall efficiency. A variable slope of the raceway in a pressing unit however involves tolerance problems, these being prevented from arising in the present invention by using at least two pressing units as already described herein above.

Preferably, the invention proposes that the operating condition-pressing force characteristic curve comprises in an operational range (compare 50 Nm to 350 Nm in FIGS. 24 and 25 resp.) a smaller average slope than below this operational range, as best illustrated in the FIGS. 24 and 25. As a result, the basic load of the overall system can be lowered causing the efficiency to increase. On the other side, arrangements could also be envisaged the characteristic curve of which is desired to have an operational range of between 100 Nm and 350 Nm like the characteristic curve illustrated in FIG. 19. Such a characteristic curve as well may more specifically be realized at a low tolerance sensitivity by two pressing units.

Figure 25:
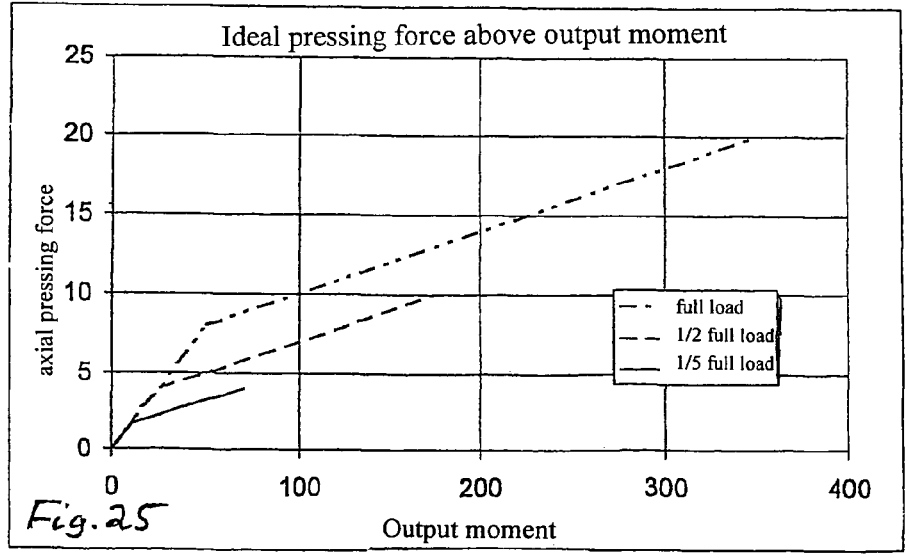
FIG. 25 shows a particularly advantageous design of a characteristic curve.

In order to moreover minimize losses in the overall system, it may be advantageous to reduce the pressing force as a function of a second operating condition, more particularly of the total load or of an input torque for example, as this is illustrated for example in FIG. 25. The efficiency of the overall system may thus be further increased.

Figure 26:
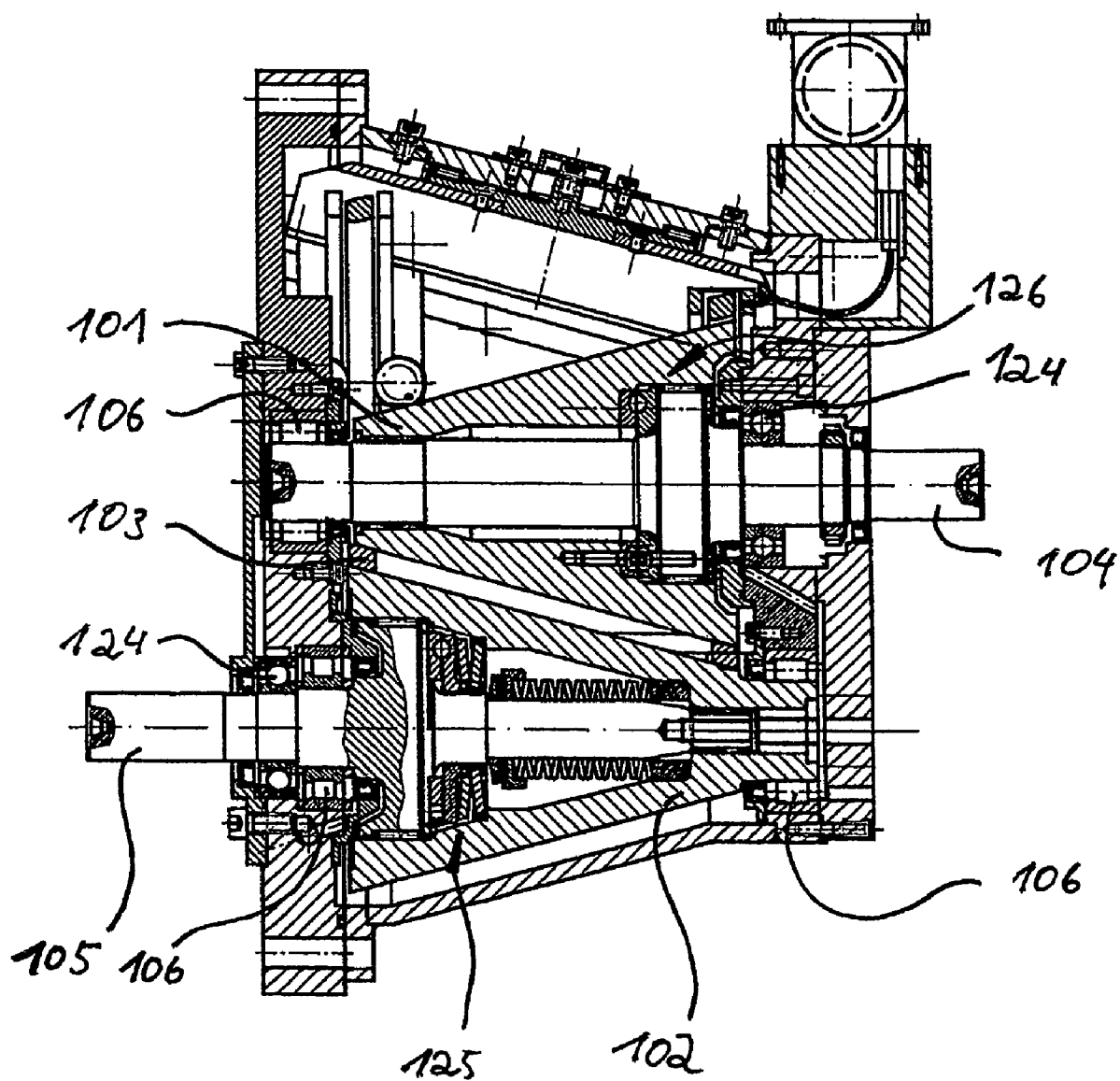
FIG. 26 shows a second friction gear of the invention in a schematic sectional view.
Figure 28:
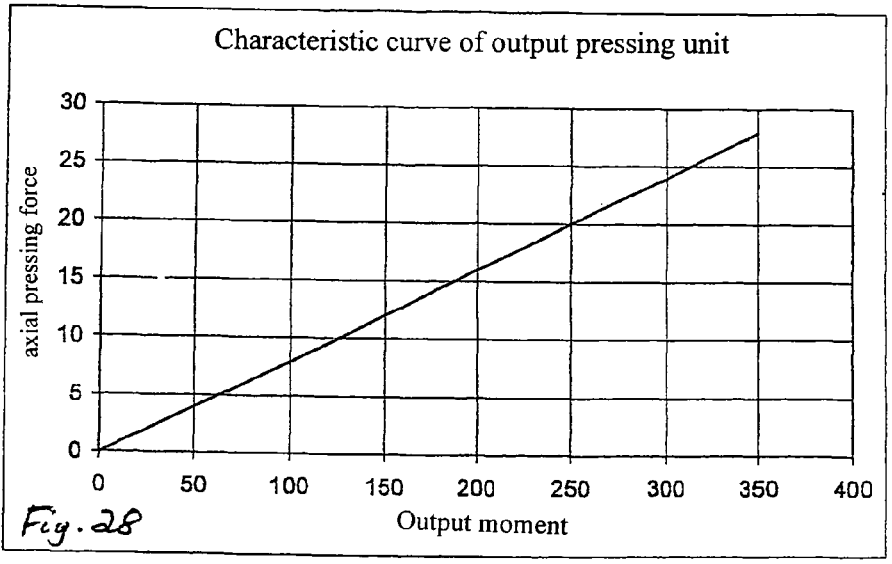
FIG. 28 shows the characteristic curve of the output pressing unit of the arrangement as shown in FIG. 26.
Figure 29:
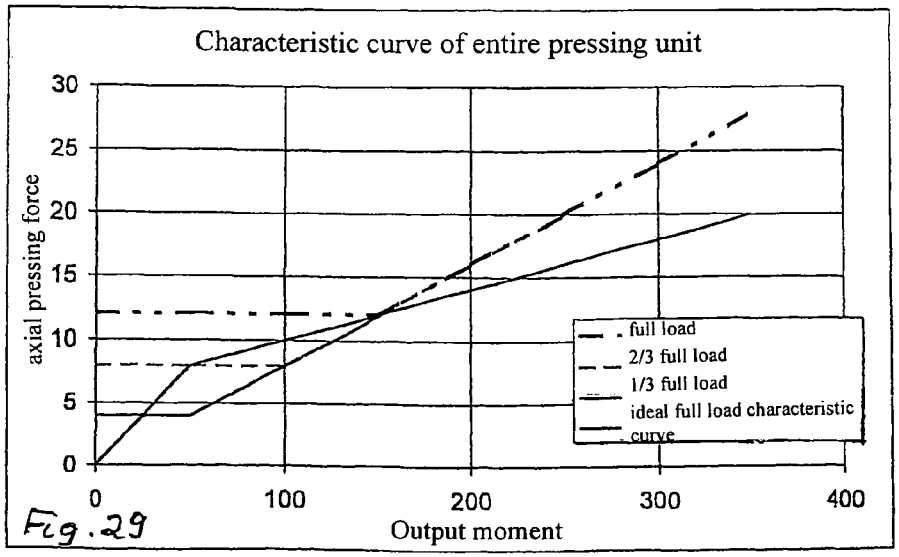
FIG. 29 shows the characteristic curve of the entire pressing unit of the arrangement as shown in FIG. 26.

This may be ensured by the arrangement illustrated in FIG. 26 for example. This arrangement substantially corresponds to the arrangement illustrated in the FIGS. 28 and 29, with the bevel gears 101 and 102 in this arrangement being carried on taper roller bearings 124 in the axial direction aside from being carried on the cylindrical roller bearings 106.

Figure 27:
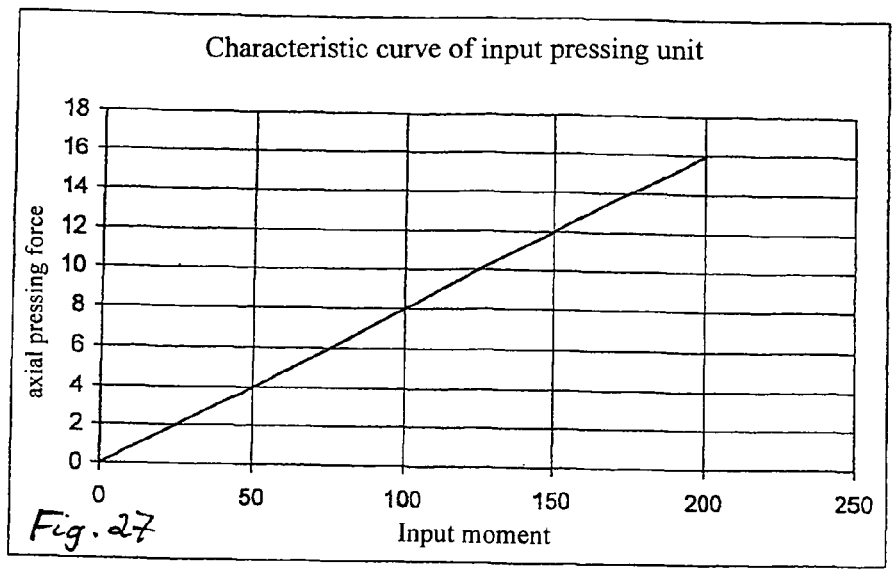
FIG. 27 shows the characteristic curve of the input pressing unit of the arrangement as shown in FIG. 26.

In this exemplary embodiment as well, the pressing apparatus is formed from two pressing units 125, 126. Deviating from the configuration in the arrangement shown in the FIGS. 28 and 29, a pressing unit 125 is disposed on the output bevel gear 102 and the other pressing unit 126 on the input bevel gear 101. In this fashion, the entire pressing apparatus is capable of directly detecting both the input torque and the output torque and convert it into a pressing force. The pressing units 125, 126 comprise the characteristic curves illustrated in the FIGS. 27 and 28. This results in the characteristic curve illustrated in FIG. 29 that substantially corresponds to the characteristic curve of the output pressing unit 125 but becomes a horizontal line at low torques as a function of the load. The slope of the characteristic curve of the output pressing unit 125 is thereby chosen to allow the characteristic curve to intersect the ideal full load characteristic curve in the operating interval so that at high output torques a sufficiently high pressing force is achieved. The entire arrangement is moreover designed so as not to fall short of the ideal full load characteristic curve at full load, even in the lower rpm range. At part load it may fall short of the ideal full load characteristic curve depending on the load so that the total load is further reduced in the system as a result thereof although too high pressing forces are provided in full load operation. By selecting the slope of the characteristic curve for the output pressing unit 125, its intersection point with the ideal full load characteristic curve may be displaced in order to thus minimize the total loss. As is evident from FIG. 29, the slope of the characteristic curve of the output pressing unit 125 cannot be chosen equal to the slope of the ideal full load characteristic curve in the operational range because in this case the effects of the second pressing units 126 are rendered inoperative.

Figure 30:
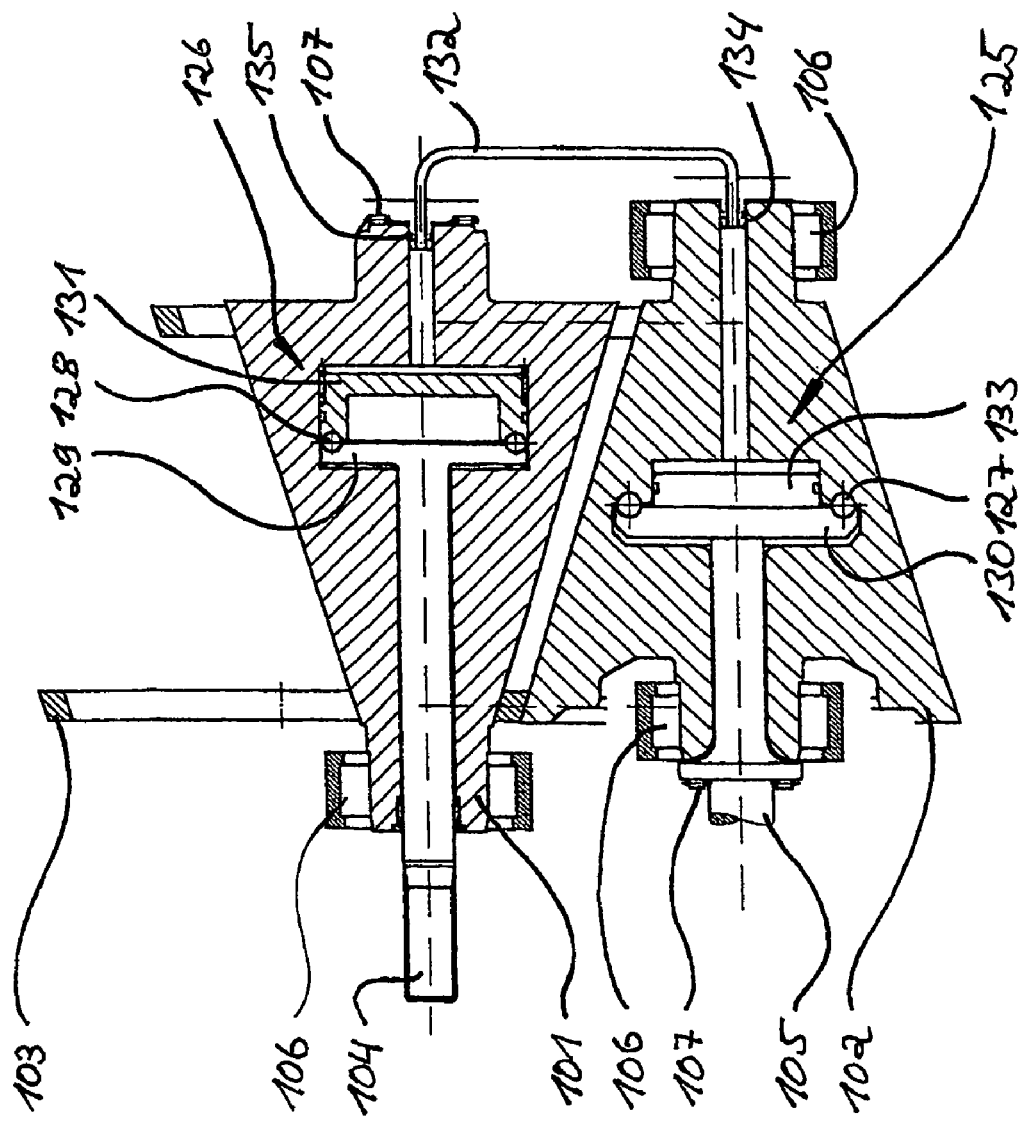
FIG. 30 shows a third friction gear of the invention in a schematic sectional view.
Figure 31:
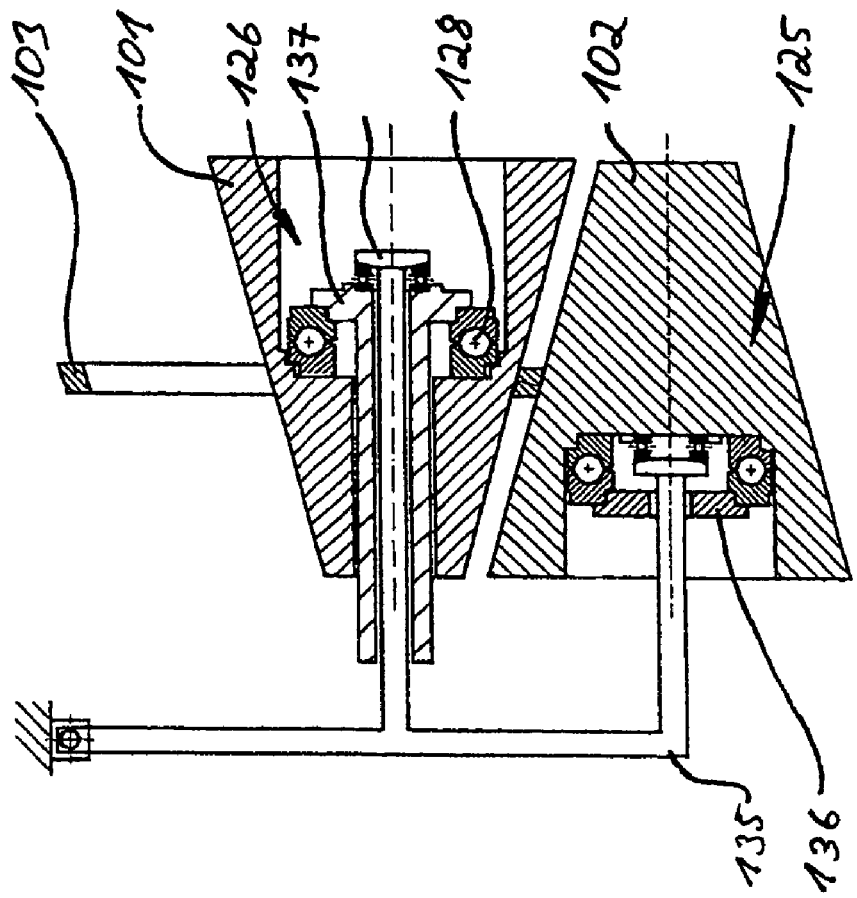
FIG. 31 shows a fourth friction gear of the invention in a schematic sectional view.
Figure 32:
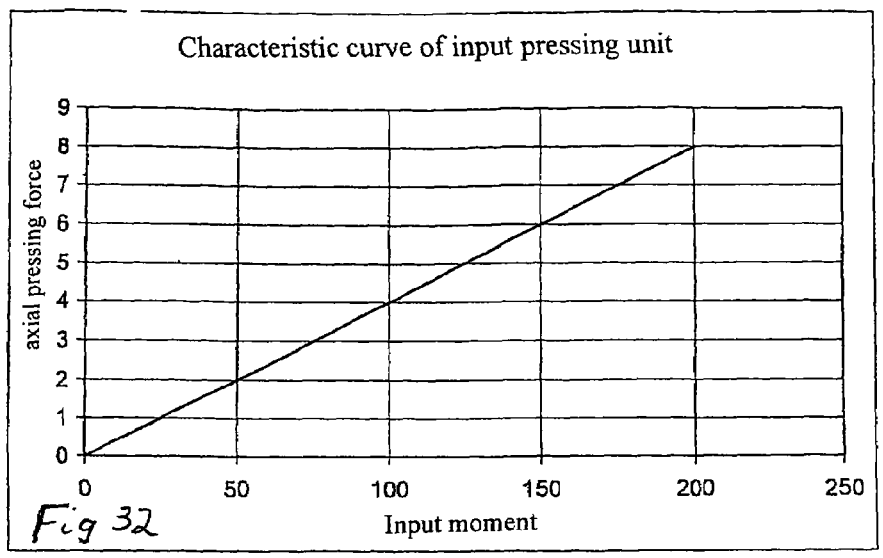
FIG. 32 shows the characteristic curve of the input pressing unit of the arrangements as shown in the FIGS. 30 and 31.
Figure 33:
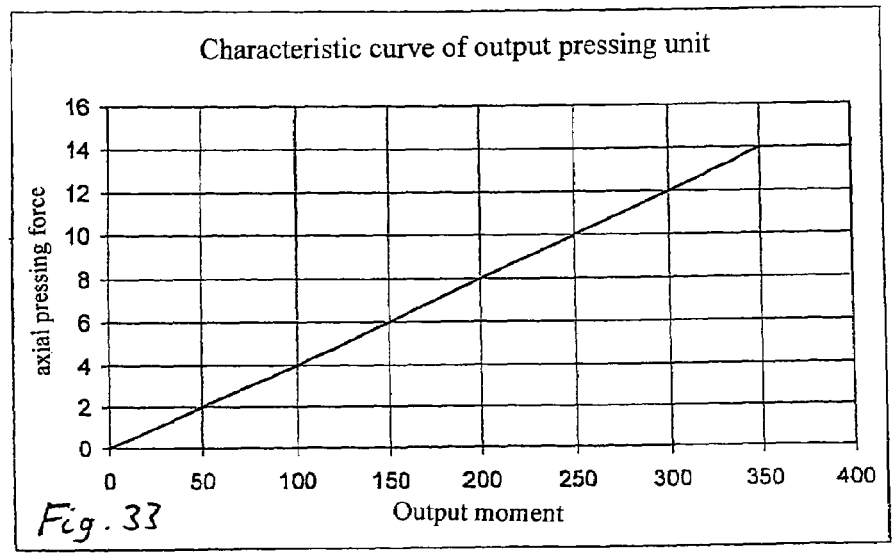
FIG. 33 shows the characteristic curve of the output pressing unit of the arrangements as shown in the FIGS. 30 and 31.

On the other side the latter is possible by coupling the two pressing units 125 and 126 as this is illustrated by way of example with reference to the FIGS. 30 and 31. These arrangements as well substantially correspond to the arrangements shown in the FIGS. 28 and 29 or 26 resp., with structural components having the same function being labelled with the same numerals.

In these embodiments as well, the pressing units 125, 126 are each disposed in various gear members of the friction gear, as this is already the case with the embodiment shown in FIG. 26. The pressing units 125, 126 hereby each include ball arrangements 127, 128 respectively supported by pressing plates 129, 130 of the input shaft 104 and of the output shaft 105 respectively. On the other side, the balls 128 are supported by a pressing plate 131 that is provided to be axially displaceable but non rotatable with respect to the input bevel gear 101. Concurrently, this pressing plate serves as a piston for hydraulic feedback 132 to a piston 133 which in turn is connected to the pressing plate 130. In the pressing unit 125 on the output side, there is not provided another pressing plate since the balls 127 are disposed directly on the driven bevel gear 102 for the rest; a separate pressing plate for receiving the corresponding raceways may be provided in this respect.

The hydraulic feedback 32 is led through leadthroughs 134, 135 into the interior of the bevel gears 101, 102, although a mechanical system 135 according to the arrangement shown in FIG. 31 could be provided instead of such a hydraulic feedback 132, said mechanical system interacting with corresponding plates 136, 137 of the pressing units 125, 126.

Figure 34:
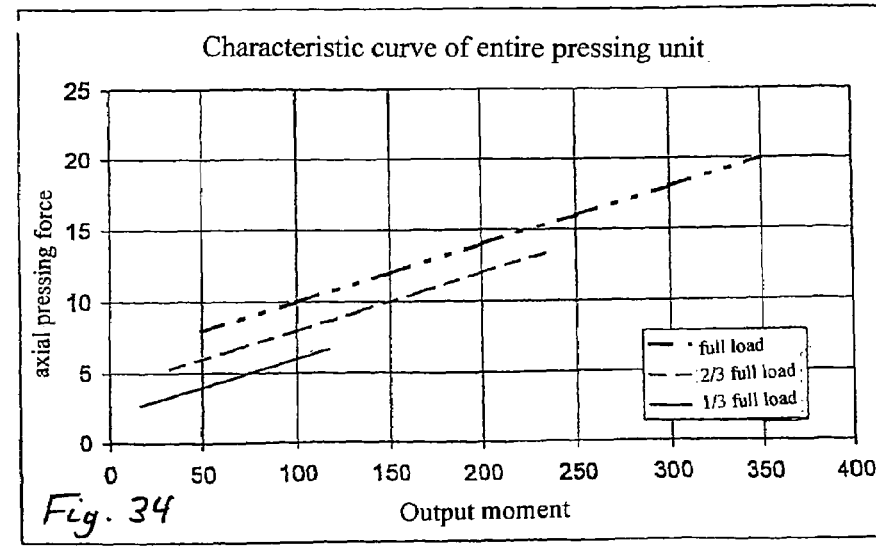
FIG. 34 shows the characteristic curve of the entire pressing unit of the arrangements as shown in the FIGS. 30 and 31.

Such a coupling permits to choose for the output pressing unit 125 a characteristic curve that has exactly the slope of the ideal characteristic curve in the operational range (see for example FIG. 25). Through the input pressing unit 126, this characteristic curve is then raised to the desired height. At low loads, it descends depending on the load so that the overall arrangement substantially follows the ideal characteristic curve shown in FIG. 25 as can be seen in FIG. 34.

The invention claimed is:

1. A bevel friction ring gear comprising
    (a) an input bevel gear;
    (b) an output bevel gear;
    (c) a friction ring forming a surrounding grip around one of said bevel gears;
    (d) a registering device for registering a torque to be transmitted; and
    (e) a pressing apparatus for locking together said bevel gears and said friction ring with said registering device; wherein said pressing apparatus comprises a pressing force applicator for applying a pressing force corresponding to the torque to be transmitted and first and second pressing apparatus parts, the first pressing apparatus part requiring a shorter reaction time than the second pressing apparatus part.

2. The bevel friction ring gear as set forth in claim 1, wherein the first pressing apparatus part is unregulated.

3. The bevel friction ring gear as set forth in claim 1, wherein the second pressing apparatus part is regulated.

4. The bevel friction ring gear as set forth in claim 1, wherein the second pressing apparatus part partially accommodates the force applied by the first pressing apparatus part.

5. The bevel friction ring gear as set forth in claim 1, wherein the second pressing apparatus part applies a pressure opposing the force applied by the first pressing apparatus part.

6. A bevel friction ring gear comprising
(a) a first torque transmitting gear member;
(b) a second torque transmitting gear member; and
(c) a pressing apparatus locking together said first torque transmitting gear member with said second torque transmitting gear member;
wherein said pressing apparatus comprises a pressing force applicator for applying a pressing force corresponding to the torque to be transmitted and first and second pressing apparatus parts, the first pressing apparatus part requiring a shorter reaction time than the second pressing apparatus part.

7. The gear as set forth in claim 6, wherein the pressing apparatus comprises a torque—pressing force characteristic curve that comprises, between a lowest torque anticipated to occur in operation and a highest torque anticipated to occur in operation, a smaller average slope under full load than below the lowest torque anticipated to occur in operation.

8. The gear as set forth in claim 6, wherein the second pressing apparatus part is hydraulically actuated.

9. The gear as set forth in claim 8, wherein the hydraulic actuation includes an electromagnetically actuated piston.

10. The gear as set forth in claim 9, wherein the piston closes an overflow/refill port on its pressure generating path.

11. The gear as set forth in claim 8, further comprising a gear pump for hydraulically actuating the second pressing apparatus part.

12. The gear as set forth in claim 11, wherein the gear pump is actuated by an electric motor that applies a voltage dependent torque.

13. The gear as set forth in claim 6 with at least two operating conditions in which at least one input member and at least one output member are pressed against each other by said pressing apparatus exerting a pressing pressure varying as a function of the respective operating condition, wherein the pressing apparatus includes at least two pressing units.

14. The gear as set forth in claim 6, wherein the two pressing units have different operating condition—pressing force characteristic curves.

15. The gear as set forth in claim 6, wherein the two pressing units have a first share in the pressing force in a first operating condition and a second share in the pressing force in a second operating condition, with the difference between the first and the second share of the first pressing unit differing from the difference between the first and second share of the second pressing unit.

16. The gear as set forth in claim 6, wherein the two pressing units are configured to act in parallel with respect to determining an operating condition and/or with respect to the pressing force.

17. The gear as set forth in claim 6, wherein the two pressing units are configured to act in series with respect to determining an operating condition and/or with respect to the pressing force.

18. The gear as set forth in claim 6, wherein at least one pressing unit has an operating condition—pressing force characteristic curve having a substantially constant slope.

19. The gear as set forth in claim 6, wherein the pressing apparatus includes at least two pressing units coupled together.

20. The gear as set forth in claim 19, wherein the coupling is configured to be mechanical.

21. The gear as set forth in claim 19, wherein the coupling is configured to be hydrodynamic or hydrostatic.

22. The gear as set forth in claim 6, wherein a first pressing unit is disposed on the input side and a second pressing unit is disposed on the output side.

23. The gear as set forth in claim 6 with at least two operating conditions in which at least one input member and at least one output member are pressed against each other by means of said pressing apparatus exerting a pressing pressure varying as a function of a respective operating condition, wherein said pressing apparatus has an operating condition—pressing force characteristic curve that has another average slope between an at rest position of the friction gear and a first operating condition than between the first operating condition and a second operating condition.

24. The gear as set forth in claim 6, wherein the first operating condition is the lowest torque anticipated to occur under full load.

25. The gear as set forth in claim 6, wherein the operating condition is chosen to be proportional to the output and/or input torque.

26. The gear as set forth in claim 6, wherein the pressing apparatus comprises a torque—pressing force characteristic curve that effects a pressing force of near 0 N at insignificant torque.

27. The gear as set forth in claim 6, wherein the first operating condition is the highest torque anticipated to occur under full load.

28. The gear as set forth in claim 6, further comprising at least two pressing units the pressing force of a respective one of which is varied by different kinds of operating conditions.

29. The gear as set forth in claim 6, wherein the pressing apparatus comprises a load dependent operating condition—pressing force characteristic curve.

30. The gear as set forth in claim 29, wherein the pressing force under loads below full load is smaller than the pressing force under full load.

31. A bevel friction ring gear comprising
(a) an input bevel gear;
(b) an output bevel gear;
(c) a friction ring forming a surrounding grip around one of said bevel gears;
(d) a registering device for registering a torque to be transmitted; and
(e) a pressing apparatus for locking together said bevel gears and said friction ring with said registering device;
wherein said pressing apparatus comprises a pressing force applicator for applying a pressing force corresponding to the torque to be transmitted and first and second pressing apparatus parts, the first pressing apparatus part providing a first pressing force that is greater than or equal to a net pressing force to be provided by said pressing apparatus, the second pressing apparatus part reducing the pressing force provided by the first pressing apparatus part.

32. A method of operating a bevel friction gear comprising the steps of:
(a) pressing at least one input bevel gear member and at least one output bevel gear member together by a pressing apparatus;
(b) operating the pressing apparatus with a first operating condition-pressing force characteristic curve that has a first average slope between an at rest position of the friction gear and a first operating condition; and (c) operating the pressing apparatus with a second operating condition-pressing force characteristic curve that has a second average slope between the first operating condition and a second operating condition;

wherein the first average slope is different from the second average slope.

\* \* \* \* \*